(12) United States Patent
Fedtke

(10) Patent No.: US 8,166,313 B2
(45) Date of Patent: Apr. 24, 2012

(54) METHOD AND APPARATUS FOR DUMP AND LOG ANONYMIZATION (DALA)

(76) Inventor: Stephen U. Fedtke, Zug (CH)

( * ) Notice: Subject to any disclaimer, the term of this patent is extended or adjusted under 35 U.S.C. 154(b) by 899 days.

(21) Appl. No.: 12/195,230

(22) Filed: Aug. 20, 2008

(65) Prior Publication Data
US 2009/0282036 A1 Nov. 12, 2009

Related U.S. Application Data

(60) Provisional application No. 61/051,434, filed on May 8, 2008.

(51) Int. Cl.
*H04L 29/06* (2006.01)
*G06F 11/30* (2006.01)
(52) U.S. Cl. ......... 713/193; 713/161; 713/165; 713/167
(58) Field of Classification Search .................. 713/193, 713/161, 165, 167
See application file for complete search history.

(56) References Cited

U.S. PATENT DOCUMENTS

| 7,028,056 | B1 * | 4/2006 | Hendel et al. ........................ 1/1 |
| 2004/0025081 | A1 * | 2/2004 | Gonzalez et al. ................ 714/25 |
| 2004/0025093 | A1 * | 2/2004 | Willy et al. ...................... 714/54 |
| 2008/0005281 | A1 | 1/2008 | Hsueh et al. |
| 2008/0120351 | A1 * | 5/2008 | Khaladkar et al. ............ 707/204 |
| 2009/0254999 | A1 * | 10/2009 | Julin et al. ....................... 726/28 |

FOREIGN PATENT DOCUMENTS
WO WO 02/23366 A1 3/2002

OTHER PUBLICATIONS

International Search Report and Written Opinion mailed Jul. 30, 2009, for International Patent Application No. PCT/IB2009/005500, filed May 6, 2009, 13 pages.
Broadwell, Pete et al. "Scrash: A System for Generating Secure Crash Information," 12th USENIX Security Symposium, Proceedings of the, Aug. 4-8, 2003, Washingtion, D.C., USA, pp. 273-284.

* cited by examiner

*Primary Examiner* — Mohammad Reza
(74) *Attorney, Agent, or Firm* — Blakely Sokoloff Taylor & Zafman LLP

(57) ABSTRACT

According to one embodiment of the invention, an original dump file is received from a client machine to be forwarded to a dump file recipient. The original dump file is parsed to identify certain content of the original dump file that matches certain data patterns/categories. The original dump file is anonymized by modifying the identified content according to a predetermined algorithm, such that the identified content of the original dump file is no longer exposed, generating an anonymized dump file. The anonymized dump file is then transmitted to the dump file recipient. Technical content and infrastructure of the original dump file is maintained within the anonymized dump file after the anonymization, such that a utility application designed to process the original dump file can still process the anonymized dump file without exposing the identified content of the original dump file to the dump file recipient. Other methods and apparatuses are also described.

24 Claims, 11 Drawing Sheets

| FAO ID | Encryption Information (e.g., Encryption Method/Parameters) |
|---|---|
| ⋮ | ⋮ |
| ⋮ | ⋮ |
| ⋮ | ⋮ |

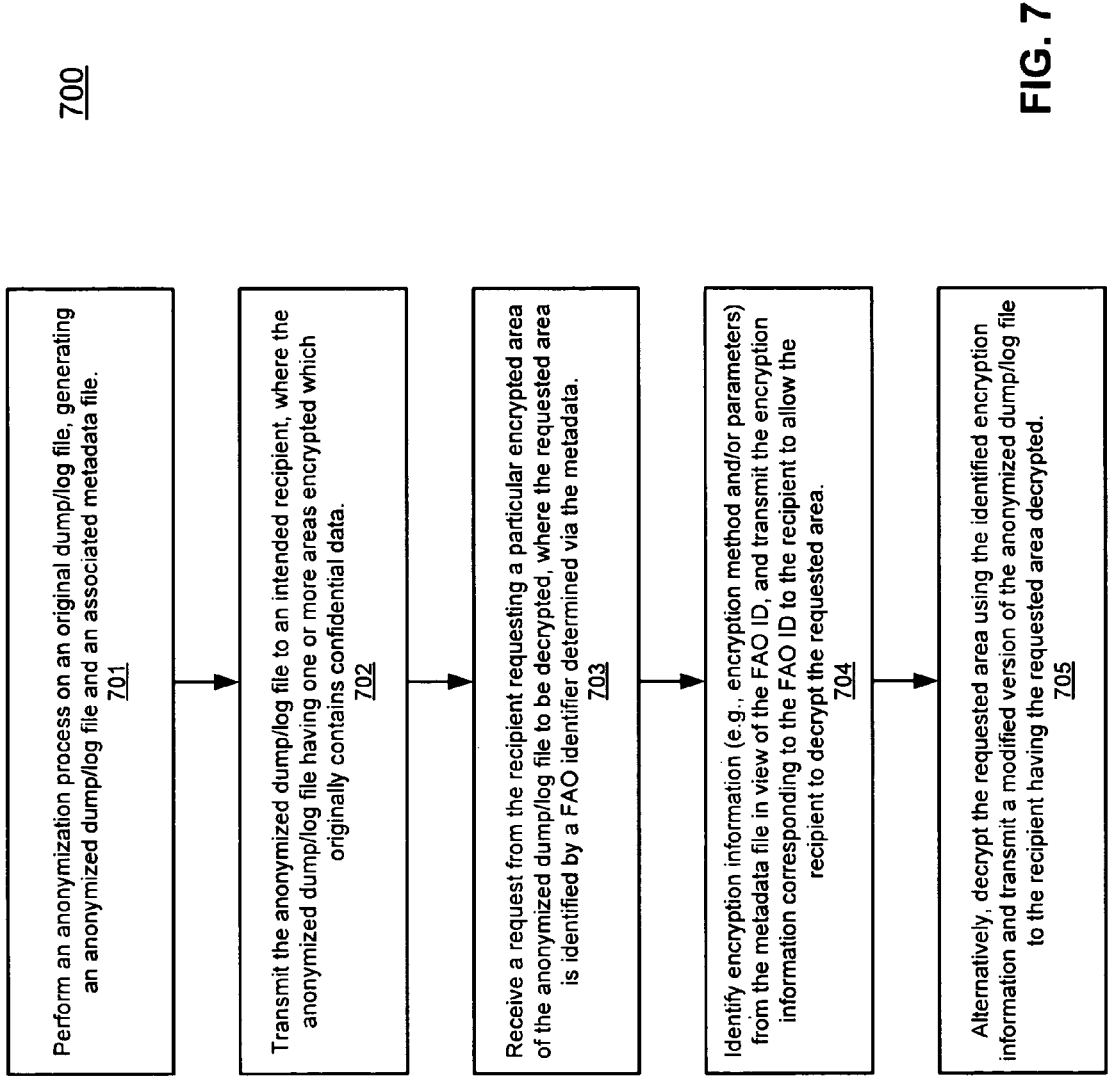

METHOD AND APPARATUS FOR DUMP AND LOG ANONYMIZATION (DALA)

RELATED APPLICATIONS

This application claims the priority of U.S. Provisional Patent Application No. 61/051,434, filed May 8, 2008, which is incorporated by reference herein in its entirety.

FIELD OF THE INVENTION

The present invention relates generally to security software. More particularly, this invention relates to anonymization of certain information within a file for security purposes.

BACKGROUND

IT (information technology) systems, subsystems, applications, etc., such as operating systems, development environments, Java environments, database systems among many others (also referred to herein as dump/log sources), create highly technical information in a form of so-called dump and log files (dump/log files). Dumps are created in such environments, for example, in case of runtime problems and errors in order to support any required problem determination and analysis (e.g., debugging). Log files are correspondingly created to protocol any activity (e.g. a firewall creates a log on all in-coming and out-coming activities). For the purpose of problem and error determination, dump/log files are exchanged in-house or with third-parties, such as software vendors and developers.

Even these files look highly technical and seem only to include "worthless" information for non-specialists; they represent a high risk to expose critical and confidential information to third-parties without knowing about this risk. Often it is their large size making any checking almost impossible. For example, "full system dumps" created by an operating system can be several gigabytes large. Dump and log files may include currently processed customer data, such as documents, names, bank accounts, credit card numbers, social security numbers, media data (images, sounds, movies), or SQL statements including passwords, etc. From a specialist's point of view, dump and log files may provide sufficient information on security mechanisms and software installed to perfectly plan an attack, or to extract critical and confidential information for misuse.

SUMMARY OF THE DESCRIPTION

Techniques for dump and log anonymization are described herein. According to one aspect of the invention, an original dump file is received from a client machine to be forwarded to a dump file recipient. The original dump file is generated from a software component running within the client machine, and the original dump file records certain runtime data and/or activities of the software component. The original dump file is parsed to identify certain content of the original dump file that matches one or more predetermined data patterns/categories. The original dump file is anonymized by modifying the identified content of the original dump file according to one or more predetermined algorithms associated with the one or more predetermined data patterns/categories, such that the identified content of the original dump file is no longer exposed, generating an anonymized dump file. The anonymized dump file is then transmitted to the dump file recipient. The technical infrastructure of the original dump file is maintained within the anonymized dump file after the anonymization, such that a utility application designed to process the original dump file can still process the anonymized dump file without exposing the identified content of the original dump file to the dump file recipient.

According to another aspect of the invention, a processing logic periodically or constantly monitors a dump file generation process of a software component running within a data processing system (e.g. operating system). As a result, an original dump file generated from the software component as a part of the dump file generation process is captured/isolated, where the original dump file is intended to be received by a remote dump file recipient over a network, and optionally is no longer available on the system it was created. The original dump file is then transmitted to a remote server over the network, where the original dump is to be anonymized within the remote server by modifying at least a portion of content that matches a predetermined data pattern/category while maintaining technical infrastructure of the original dump file. An anonymized dump file is then generated by the remote server and the anonymized dump file is then transmitted from the remote server to the remote dump file recipient over the network, such that the anonymized dump file can still be processed by the dump file recipient without exposing the content that matches the predetermined data pattern/category.

Other features of the present invention will be apparent from the accompanying drawings and from the detailed description which follows.

BRIEF DESCRIPTION OF THE DRAWINGS

The present invention is illustrated by way of example and not limitation in the figures of the accompanying drawings in which like references indicate similar elements.

FIGS. 6A-6B are block diagrams illustrating an example of an undo or recovery system according to one embodiment of the invention.

FIG. 7 is a flow diagram illustrating a process for recovering confidential information from an anonymized dump file according to one embodiment.

DETAILED DESCRIPTION

Techniques for dump and log anonymization are described herein. In the following description, numerous details are set forth to provide a more thorough explanation of embodiments of the present invention. It will be apparent, however, to one skilled in the art, that embodiments of the present invention may be practiced without these specific details. In other instances, well-known structures and devices are shown in block diagram form, rather than in detail, in order to avoid obscuring embodiments of the present invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification do not necessarily all refer to the same embodiment.

Accordingly, embodiments of the dump and log anonymization (DALA) software enable a user to identify, separate, and/or remove certain confidential information from a dump/log file while leaving only technical detailed information. DALA allows anonymization without affecting or questioning the technical usability/value of the dump/log file, such as technical information to be processed with a debugger or analysis tool. DALA is utilized to block any critical/confidential information to any third-party. DALA also includes a component to prevent any system and/or software environment from providing and/or creating dump/log files that are accessible by regular users of a computer. DALA is also configured to prevent accesses to confidential or security-critical information by a local user of the system. A DALA agent constantly or periodically monitors the system concerning such dump/log file creation process. Note that for purposes of illustration, a dump file and a log file are interchangeable terms for variable embodiments throughout this application. When a dump file is discussed, a log file may also be applied, or vice versa.

Figure 1:
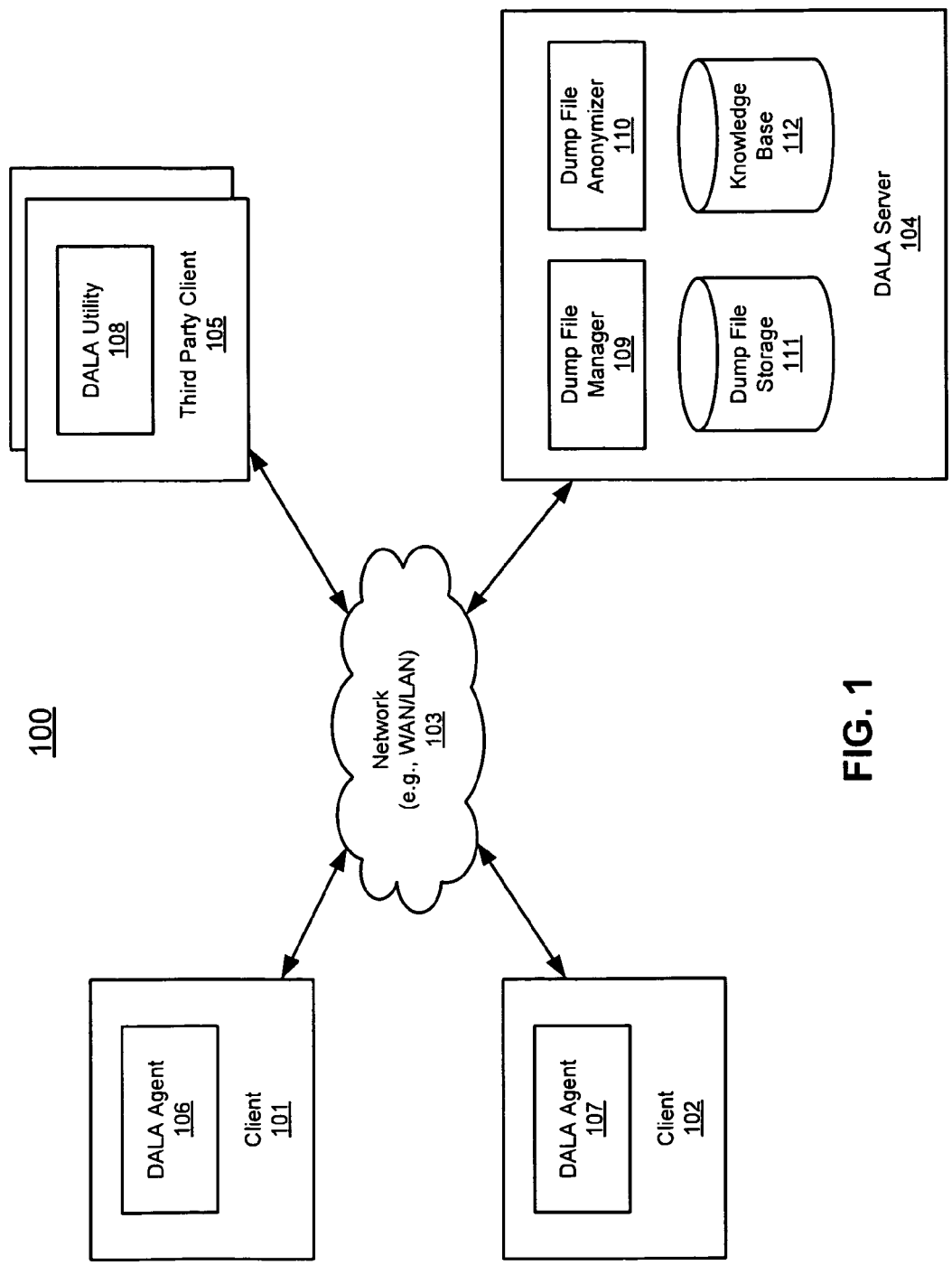
FIG. 1 is a block diagram illustrating an example of network configuration according to one embodiment of the invention.

FIG. 1 is a block diagram illustrating an example of network configuration according to one embodiment of the invention. Referring to FIG. 1, network configuration 100 includes one or more clients 101-102 communicatively coupled to a DALA server 104 over a network 103. Note that although a single server 104 is shown; however, multiple DALA servers (e.g., server farm or mirror servers) may be implemented. Clients 101-102 may be any of data processing systems, desktop or mobile devices. Network 103 may be a local area network (LAN) such as Intranet of an enterprise entity or alternatively, network 103 may be wide area network (WAN) such as the Internet. Note that network 103 may be a single network or may include multiple networks of different types.

According to one embodiment, each of the clients 101-102 includes a DALA agent (e.g., agent 106-107) respectively to periodically or constantly monitor specific activities of clients 101-102, including monitoring certain dump/log files potentially created by an application or operating system of clients 101-102. For example, agent 106 of client 101 may intercept any dump/log information that normally is saved to a dump/log file and the agent 106 then may transmit the intercepted dump/log information to DALA server 104, where the dump/log information is stored as an original dump/log file in a dump/log file storage 111 of server 104.

In addition, the dump/log information may also be anonymized by a dump/log file anonymizer 110 to modify, remove, and/or anonymize certain confidential and/or specific information of the dump/log file based on certain information stored in knowledge base 112. An anonymized dump/log file is then created which may also be stored in the dump file storage 111. Knowledge base 112 may include a variety of information that can be used by the dump file anonymizer 110. For example, knowledge base 112 may include certain information that identifies a type of a particular dump file so that the dump file anonymizer 110 would not alter the technical infrastructure of the original dump file. As a result, after the anonymization, a utility associated with the original dump file (e.g., debugger or log viewer) is still able to process the anonymized dump file, although certain confidential and/or specific information has been anonymized.

In addition, knowledge base 112 further includes certain information that identifies what kind of information would be considered as "confidential" (e.g., data patterns, categories) and should be removed or modified by the dump file anonymizer 110, which may be configurable by a DALA user or an administrator. Several kinds of criteria can be used to identify dump file areas including "confidential" information, such as content, category, etc. For example, the memory of a system is an example of requiring both content and category-based identifications. Storage/memory categories are global storage, private, fetch-protected, etc., and memory anonymization may also be recommended just by that category (e.g. fetch-protected memory will most probably include confidential information), not only by its content (e.g., data pattern). In one embodiment, knowledge base 112 may include a "white list" that explicitly excludes certain types of content from being anonymized. Similarly, knowledge base 112 may include a "black list" that explicitly includes certain types of content to be anonymized. These specific configurations may be configurable dependent upon specific circumstances.

Information stored in storages 111-112 may be managed by a dump file manager. The anonymized dump/log file may then be transmitted to a third-party client 105 such as a software vendor. The third-party client may also be provided with a DALA utility 108 which can be used to process the anonymized dump/log file. Note that throughout this application, a dump file is utilized as an example of any file that may be anonymized, including an actual dump file or a log file.

According to one embodiment, local DALA agents 106-107 running on clients 101-102 to intercept and control the different dump/log file creation processes may be configured to route any occurring dump/log information or files, in combination with additional information on local system's runtime environment, to the central DALA manager/server 104. An administrator such as a confidential information exchange manager of an organization associated with server 104 may be responsible for providing dump/log files to other parties such as third-party client 105. Thus, the administrator may use DALA manager 109 to perform and support all activities such as, for example, starting with the anonymization process itself, its configuration, and ending with the actual transfer of the anonymized dump/log file to the third-party 105.

In one embodiment, a local agent such as agent 106 does not perform any anonymization on a dump file locally created by an application (e.g., firewall application), an operating system (e.g., kernel, device driver, application runtime environment), or a server (e.g., database server). Rather, the local agent may simply intercept and transmit the dump file to DALA server 104 where the anonymization is then performed by DALA server 104. The original dump file may be transmitted from a client to server 104 in an unencrypted or encrypted manner, compressed or uncompressed, dependent upon a specific implementation. In a particular embodiment, a local agent may directly intercept the dump information from a dump creator (e.g., application or operating system) without allowing the dump information to be stored locally. As a result, the original dump file would not be stored locally and the confidential information embedded therein would not be accidentally revealed locally.

Alternatively, a local agent may allow the original dump file to be stored in a local storage by the dump file creator and then transmit the original dump file to DALA server 104 for anonymization. In a further embodiment, a local agent may perform partial or entire anonymization process locally before transmitting a dump file to server 104. Other configurations may also be implemented.

Figure 2:
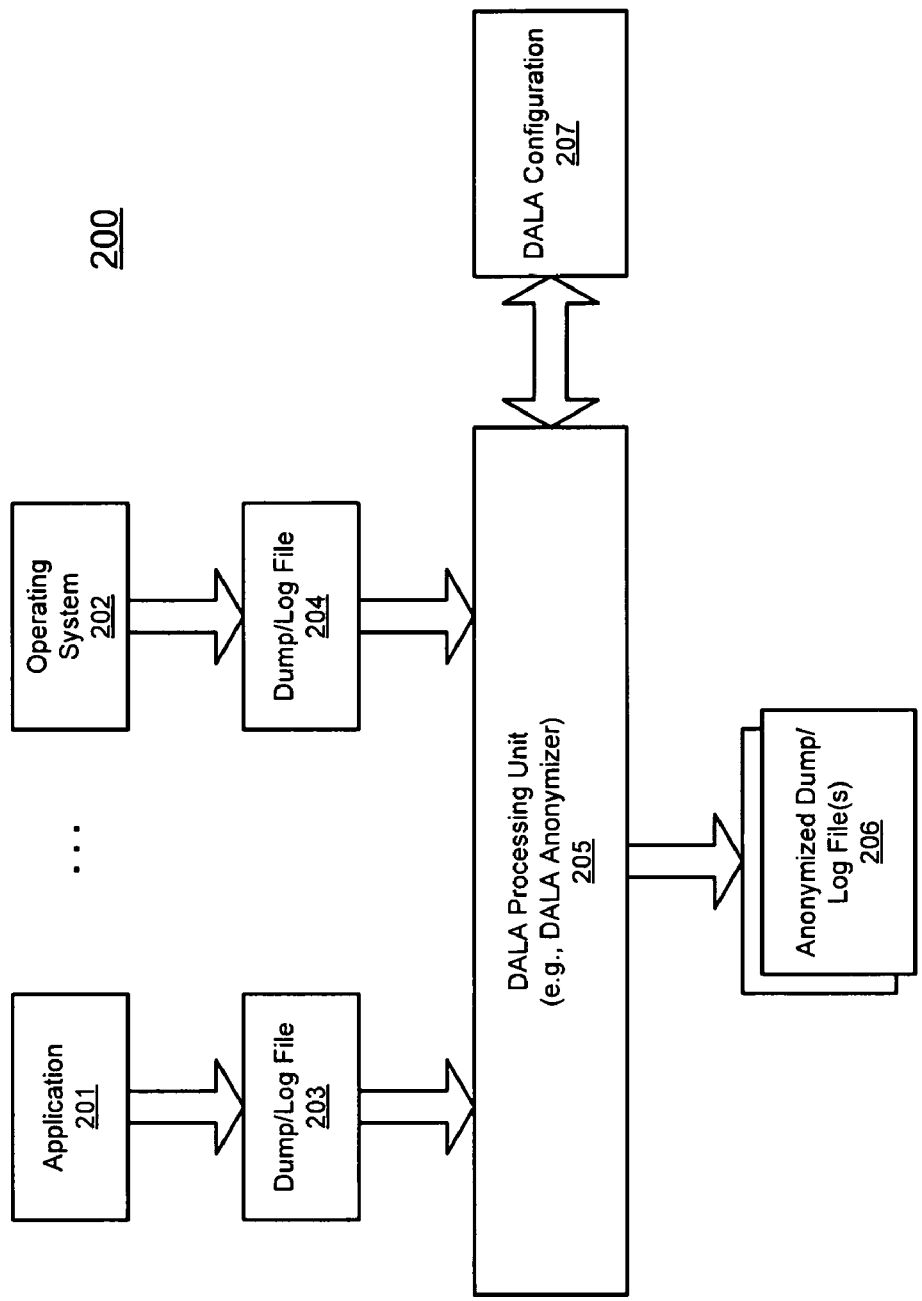
FIG. 2 is a block diagram illustrating an example of a DALA system according to one embodiment of the invention.

FIG. 2 is a block diagram illustrating an example of a DALA system according to one embodiment of the invention. For example, system 200 may be implemented as part of system configuration 100 of FIG. 1. Referring to FIG. 2, as described above, system 200 includes one or more dump file creators 201-202 (e.g., application, operating system). System 200 further includes a DALA processing unit 205 that is configured to process the original dump files 203-204 created by the dump file creators 201-202. DALA processing unit 205 represents some or all of the components of DALA server 104 of FIG. 1. In one embodiment, DALA processing unit 205 performs an anonymization process on the original dump files 203-204, including removing or modifying certain confidential information to generate anonymized dump files 206 and verifying the technical usability of the anonymized dump files 206 from a technical specialist's perspective, based on certain configuration 207 which may be implemented as part of knowledge base 112 of FIG. 1.

Referring to FIG. 2, system 200 includes a processing logic (e.g., a software agent) running on each system (not shown) to intercept different dump/log file creation processes (e.g., application 201 or operating system 202) in order to prevent any unknown/unrecognized dump/log file creation that provide critical information on the system and its applications to a local (e.g., non-administration) user. The processing logic further gathers information on the runtime operating environment of the system, such as the operating system type, current memory mapping, etc., which may be packaged within data/file container (also referred to as a DALA dump/log file envelope). Alternatively, such additional information may be transmitted or obtained via a separate file or communication mechanism. This information especially becomes necessary in a situation that not a full system dump was created by the dump/log source or creator. For example, a printable dump file sometimes only includes a few memory regions. The processing logic then forwards any dump/log file to a DALA manager (e.g., DALA processing unit 205) for further processing. An embodiment of the invention prevents any dump/log files from being automatically sent to third-parties via a Web connection, especially without having passed anonymization.

In one embodiment, the processing logic (e.g., local agent) is configured to intercept a dump/log file created or dumped by a variety of operating systems. For example, for Microsoft Windows operating system, the Windows process dump mechanism (formerly known as "Dr. Watson") is controlled by several registry keysets, depending on the OS version:

W2K, W3K, XP: HKLM\Software\Microsoft\PCHealth\ErrorReporting\DW\ . . .

W2K8, Vista: HKLM\Software\Microsoft\Windows Error Reporting\ . . .

With coming releases/versions other controls and elements (e.g. API, system modules, system DLL) of the operating system may be involved, and need to be used or intercepted.

Starting with the Vista version, there is a WER-API (e.g., WindowsErrorReporting), which can be used to fine tune dump contents and to control the sending of dumps. Generation of system dumps cannot be intercepted, but sending these dumps to a corporate server (or Microsoft servers) can be intercepted in order for DALA to process the dumps. With coming releases/versions other controls and elements (e.g. API, system modules, system DLL) of the operating system may be involved, and need to be used or intercepted.

For IBM's z/OS, the following system exists to let a user intercept and detect the creation of all kinds of system dumps:

IEAVADFM: Format SNAP, SYSABEND, and SYSUDUMP Dumps

IEAVTSEL: Post Dump Exit Name List Exit

With coming releases/versions other controls and elements (e.g. API, system modules, system DLL) of the operating system may be involved, and need to be used or intercepted.

In one embodiment, the DALA agent scans the file system in a regular basis for dump/log files. For example, dump files may be primarily identified by their filename, file extension (e.g. *.DMP), or unique content (e.g., headers, "eye catcher").

Figure 3:
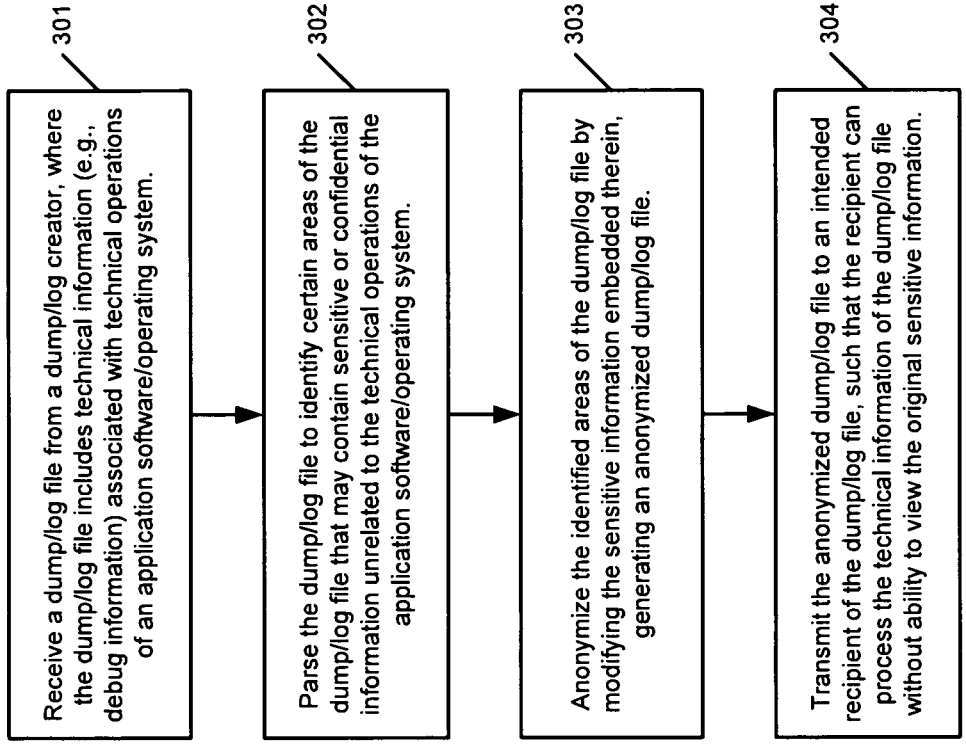
FIG. 3 is a flow diagram illustrating an example of a process for anonymization according to one embodiment of the invention.

FIG. 3 is a flow diagram illustrating an example of a process for anonymization according to one embodiment of the invention. Note that process 300 may be performed by processing logic which may include software, hardware, or a combination of both. For example, process 300 may be performed by systems 100 or 200 of FIGS. 1-2. Referring to FIG. 3, at block 301, a dump file is received from a dump file creator (e.g., application or operating system). The dump file includes certain technical information (e.g., debugging information) associated with technical operations of the dump file creator. As described above, the dump file may be intercepted by a local agent running within the same operating environment of the dump file creator and transmitted from the local agent over a network which may be a LAN or WAN.

In response to the dump file (e.g., original dump file), at block 302, processing logic parses the original dump file to identify certain areas of the dump file that may contain sensitive or confidential information that is unrelated to the technical operations of the dump file creator. At block 303, processing logic performs the anonymization process on the original dump file by modifying (e.g., overwriting, encryption, or deletion) the confidential information embedded therein. An anonymized dump file is then generated. Note that whether particular information is considered as "confidential" is user configurable. Information considered as confidential information by a user may not necessarily be considered as confidential by another user. This configuration information may be stored as a part of knowledge base 112 of FIG. 1. At block 304, the anonymized dump file can be transmitted to a third-party client as an intended recipient of the original dump file. As a result, the recipient can process (e.g., debug) the technical information of the dump file without the ability to view the original confidential information.

According to one embodiment of the invention, removing the confidential information in order to anonymize the dump/log file is performed by a length and file structure neutral overwriting of corresponding positions in the dump/log file. Alternatively, the data can also be completely (e.g., physically) removed.

Dump/log files are of a specific format designed by a developer of the dump/log source and known/used by corresponding tools to use these dump/log files. For example, dump analysis tools, debuggers or similar software needs to know the structure/format of its supported dump/log files.

Therefore, one of the goals of dump/log file anonymization is not to have an impact on the principal usability of these tools (by the third-party) to solve a problem that a dump/log file was actually created for. Therefore, when anonymizing a dump/log file, DALA is capable of differentiating among application/user data and dump/log file related control, structural information, or content.

According to certain embodiments, DALA processing logic achieves an optimized balance among overwriting (anonymizing) information and keeping the information-related value for the technical specialists to solve the actual problem. The technical usability is not affected. For example, DALA may not change any dump/log file record header including technical and/or file-related detail information, such as memory-related information (e.g., memory category, content category) described by the particular record.

Therefore, processing logic should be able to identify relevant confidential information patterns/categories in order not to overwrite any technical information required by the third-party. For example, DALA does not simply overwrite any occurring printable text since this may represent important technical information such as a module name, or control block identifier ("eye catcher").

The actual information, which is left in the dump/log file and thus is provided and/or forwarded to the third-party, includes most or all technical info, such as, for example, non-critical program code, contents of all control block structures belonging to the software (e.g. to the operating system), or technical analysis information, etc.

Figure 4:
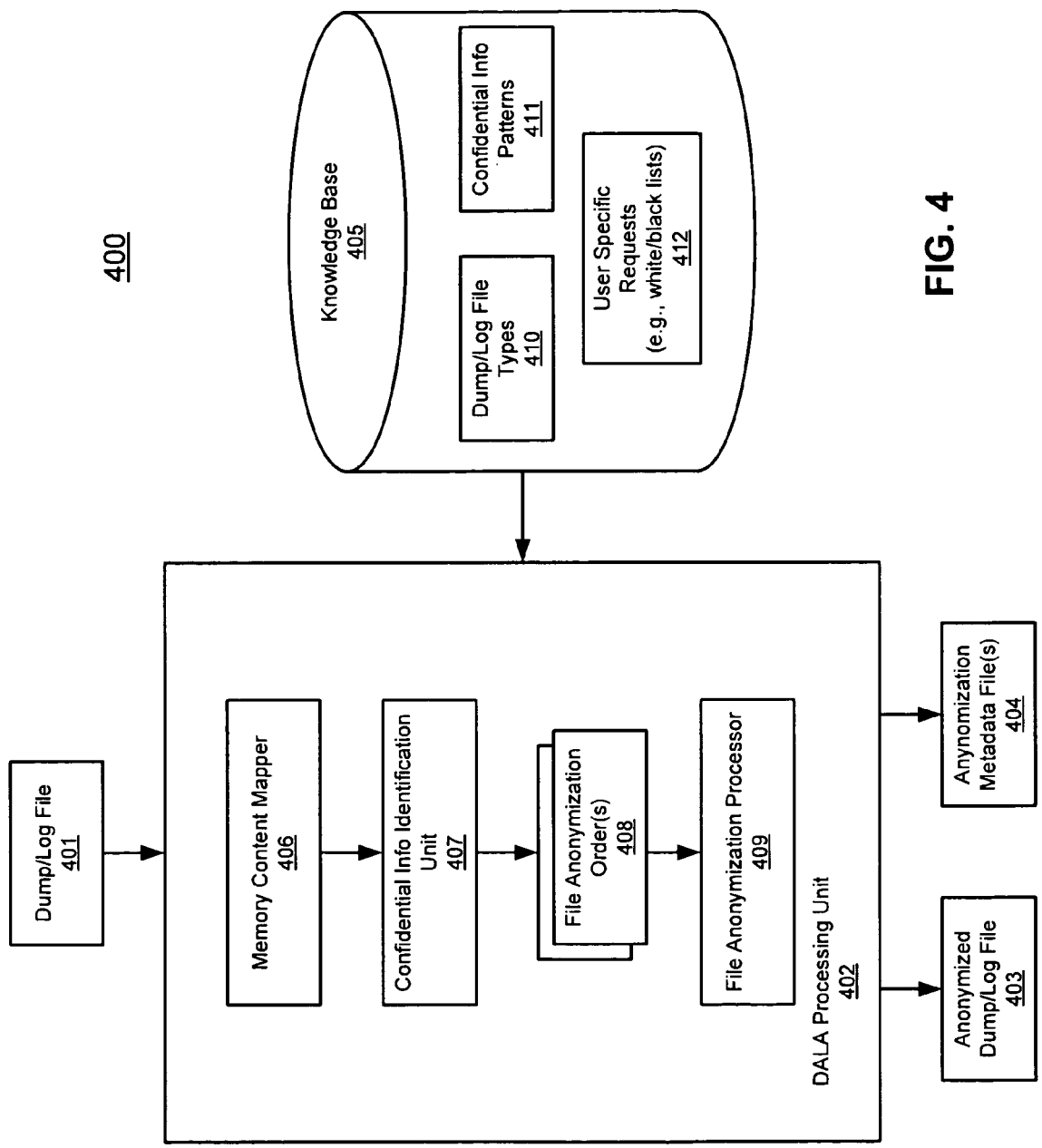
FIG. 4 is a block diagram illustrating a DALA system according to one embodiment of the invention.

FIG. 4 is a block diagram illustrating a DALA system according to one embodiment of the invention. For example, system 400 may be implemented as part of DALA server 104 of FIG. 1. Referring to FIG. 4, DALA processing unit 402 is configured to anonymize dump file 401 based on certain information obtained from knowledge base 405, where dump file 401 may be captured by a local DALA agent of a client and transmitted over a network which may be a LAN or WAN. DALA processing unit 402 then generates an anonymized dump file 403 as well as other metadata 404 associated with the anonymized dump file 403. Metadata 404 may include certain technical details of the anonymization process, which may be utilized to recover certain anonymized information of the original dump file from the anonymized dump file. Note that processing unit 402 may be implemented as part of processing unit 205 of FIG. 2.

According to one embodiment, the anonymization process includes certain identification procedures and algorithms to identify "confidential information" relevant for anonymization. The "confidential information" can be, for example, 1) regular text-based information coded in any character set (e.g., ASCII, EBCDIC, Unicode, user-defined character set, etc.); 2) encrypted and/or enciphered information residing in the dump/log file (even if this information is not directly readable it may be extracted for decryption/decompression trials); this information is anonymized even if DALA cannot decipher/decrypt it since the fact of being encrypted and/or enciphered identifies the data as confidential; 3) specific program code in order not to show this machine code to others for reverse engineering (due to copyright, or in order to prevent any exposure of security mechanisms).

System 400 further includes a knowledge base 405 having dump file type information base 410 regarding formats of the dump/log files in order to prevent any invalid overwriting of dump/log file structure-related bytes. DALA processing unit 402 can also process dump/log files without knowing the dump/log file structure, where any missing knowledge limits only the spectrum of algorithms applicable to identify confidential information.

Knowledge base 405 further include confidential information patterns/categories regarding specific data types/structures for identification, such as formats of zip codes, fax & phone numbers, bank account numbers, credit card numbers, among others; also knowledge on possible first and last names, cities, etc. The confidential information patterns/categories may be used to identify whether certain information of a dump file should be considered as "confidential."

Knowledge base 405 further includes DALA control (command) or user specific information base 412 which provides a capability to instruct DALA processing unit 402 not to "touch" (anonymize or modify) certain areas of the dump/log file (e.g., a white list). This "white list" concept is required, for example, in a situation in which a third-party cannot solve the problem without this information. The dump/log file provider then may define an exception for particular parts of the dump/log file. Similarly, a "black list" allows a user explicitly to instruct DALA processing unit 402 to anonymize or modify a particular dump/log file area even if it was not identified by a normally applied identification method.

System 400 further includes capabilities to support installation or user-defined search patterns/categories for individual types of critical information and knowledge on the design of the different processors, operating systems, applications, etc., in order to differentiate their elements, memory categories, etc. This information may be provided by a dump/log file and/or by referring to the runtime environment of the dump/log source (e.g. to determine information on the storage keys, storage subpools, virtual storage mapping, etc.).

Referring back to FIG. 4, processing unit 402 includes, but is not limited to, a memory content mapping unit 406, confidential information identification unit 407, and file anonymization processor 409. Based on dump file 401, memory content mapping unit 406 is configured to create DALA internal data structures representing sequences of continuous data/memory areas (of the same address space in case of virtual addresses). For example, a dump/log file includes a sequence of records each representing a physical memory page, the mapping will bring these records/pages in a sequence representing the virtual/linear memory sequence a regular program (e.g., application) is working with; this is important in order to prevent breaks in a data sequence at page/record border. These memory areas are passed to the confidential information identification unit 407 for scanning in an attempt to identify certain confidential information patterns/categories in the dump file. The data structures may represent either physical or virtual storage (e.g., pages) dependent upon the dump file type, dump source, and other factors. The DALA-internal data structures allow direct references from each memory location to the actual or original dump file data (e.g., offset and length in the dump file) or vice versa.

Confidential information identification unit 407 includes a set of one or more algorithms or methods represented by corresponding modules for processing the memory areas received from the memory content mapping unit 406, including scanning the received memory segments for certain information, such as readable text, credit card numbers, etc. In one embodiment, the confidential information identification unit includes multiple "active" units (also referred to herein as confidential information identifier(s) or CII(s)) for searching the dump/log file for their specific types of confidential information. Actually, almost each byte of the dump/log file passes the observation of all CIIs, and each one may detect anything. For example, a credit card number represents a 16-digit number starting with a 6-digit card company ID, followed by a 9-digit account number, and followed by a 1-digit checksum. Some programs store the credit card number as a sequence of 16 characters, others use 4-digit groups separated by a blank or "-". Depending on the runtime environment (e.g., processor or application) the sequence of digits may be stored as printable characters, or as packed numbers, etc. The credit card number CII checks corresponding sequences of digits for being a valid credit number by checking the card company ID against a dictionary given in the knowledge base, by excluding impossible/non-plausible account numbers, such as a sequence of identical digits, and by recalculating and checking the checksum. Furthermore, the "mm/yy" or "mm/yyyy" expiration date and/or the name is also given, and stored "not far away" from the credit card number. The credit card number CII receives required information/controls from the knowledge base and user controls. Another example is given with the compressed data identifier searching for data stored in a compressed manner that is not directly readable (e.g. the dump receiving party could decompress the data to access and read the original content).

According to one embodiment, confidential information identification (CII) unit 407 may include a printable text identifier, a compressed data identifier, an encrypted data identifier, a software (e.g., operating system or application) component identifier, a compressed data identifier, a metadata identifier, a memory category identifier, a dictionary based item identifier, a ZIP code identifier, a bank account number identifier, a credit card data identifier, a generalized data record identifier, a free pattern/category identifier, a sensitive SQL (structured query language) data identifier, an IP (Web or email address) identifier, a phone/fax number identifier, a user-specific data identifier, a spectrum analysis based identifier, and a social security number identifier, etc.

Each CII's analysis is resulting in none, one or more file anonymization orders (FAO) 408 instructing the file anonymization processor 409 to anonymize a particular byte sequence of the dump/log file by using a particular anonymization or overwriting method. Each single FAO may use an individual method, and may describe one or more areas to anonymize by including one or more start offset and length pairs. FAOs 408 may also overlap each other, for example, when several CIIs decided to anonymize the same dump/log file area, or a common part. Each FAO receives a unique ID (FAO ID) that enables a user to refer to each FAO. The white list concept, for example, enables a user to refer to an FAO via its ID, such as in order to disable a particular anonymization at a FAO level. In one embodiment, a FAO includes, but not limited to, a FAO ID, source ID having generated the FAO that may be used to identify the CII, white list, etc., comment/description provided by the FAO source giving additional information why anonymization was decided positively (e.g., why the FAO was created in the given situation), dump file offset identifying the first byte, anonymization length (e.g., offset-length pairs may appear several times to identify several areas with a single FAO), anonymization method describing how the data becomes anonymized (e.g., text overwrite, encryption, physical deletion, etc.), anonymization parameters (amount and spectrum depends on the anonymization method; e.g. keys, etc.), and further administrative information.

Since the "confidential" term is abstract, it generally represents and stands for all user-related/-owned non-technical information in such a dump/log file. Expressed as a formula, DALA's assumption is:

Confidential information=all information−technical information

The identification process applied by DALA to identify confidential information relies on a set of CIIs. Each CII works independently and targets different kinds of (confidential) information, and is based on different methods and algorithms. Some of them even provide common data, i.e. data that becomes available to other CIIs. Each CII will create FAOs for each identified item (or item group) that needs to be anonymized.

Confidential data (e.g. customer data) is often coded and stored in a form of records. For example, the dump/log file may include memory areas having a sequence, i.e. several of such records. Using dictionaries with lists of common last names, first names, zip codes and other items, or using specific information identification methods, such as methods determining a valid credit card number, all that will most probably refer to any location inside such a record (not necessarily to the beginning of the record). DALA therefore supports anonymizing an entire area around such an identified item, in order to remove the entire data record even not all elements were explicitly identified via the dictionary or identification methods. Furthermore, DALA tries to determine/identify an n-record structure (in the memory areas of the dump) in order to anonymize the complete record sequence by just finding a single "evidence".

Each term/string defined in any of DALA's dictionaries, or any search pattern, a user may combine with a "scope" describing how to treat an area around a location including the found items. For example, a user may configure DALA to always anonymize a specific area around (forward and backwards) that term. Anonymizing the environment/scope may be limited by absolute length values, or a list of delimiters, or similar. In case the dump/log file has a record-oriented structure known to DALA, a user may also configure DALA to anonymize the entire record when a single critical term was found inside.

The DALA concept is open and will provide CIIs for some or all commonly critical information that is based on a kind of standard. For example, credit card numbers are coded and stored in specific formats, and even have a checksum and other conventions that allow a user to differentiate them from any arbitrary sequence of digits/numbers. DALA users may also integrate their own CIIs for their specific information occurring in their fields of business by using the DALA APIs.

According to one embodiment, DALA is configured to avoid processing of non-confidential printable information. For example, the printable text identifier CII may extract sequences of printable characters that exclusively include special characters (e.g. /, (, ), etc.), blanks, multiple repetitions of a single character, and/or exclusively terms of the non-confidential (technological) terminology. These sequences may be ignored by the CII since they are probably non-confidential. However, another CII could identify confidential information, such as a bank account in this area of the dump/log file. All CIIs work almost independently (even they may share/exchange information).

The entire dump/log file scan process may require one or more passes of complete dump/log file processing (reading). The CII's principal of operation decides on when, i.e. after how many passes the CII is able to decide whether given data residing in the dump/log file is "confidential." During anonymization, the CIIs may/will refer to the original dump/file content. All anonymization only result in FAOs that are performed first when all analysis was completed. Some of DALA's CIIs are language and/or country-sensitive. For example, the general ZIP code and phone & fax numbers formats differ among countries. DALA may include a file pre-analysis process to determine the type/format of the dump/log file itself by evaluating the file. For example, by searching for specific headers, etc. According to an alternative embodiment, the dump/log file may be directly altered by the corresponding CIIs without having to generate FAOs. Other configurations may also exist.

To effectively anonymize and/or overwrite byte sequences ranging from 1 to n bytes anywhere in the dump/log file, DALA provides several methods or operating modes, including, for example, full overwriting, encryption, and deletion.

In a full overwriting mode, according to one embodiment, a user may define a string that is continuously and repeatedly placed at corresponding locations, such as, for example, "This dump/log file has passed DALA anonymization; if you need any memory area for problem determination, please contact Mr. Smith at (224)628-6848". Small memory areas being anonymized will thus include only parts of that phrase. The character set used to code this anonymization text depends on the major character set used on the platform the dump/log file comes from. The user may select any string and character set.

One of the advantages of this method is given by a highly transparent and obvious way to indicate anonymization. Furthermore, un-hiding any information is almost impossible. If a programmer displays or lists corresponding memory areas in a debugger (e.g. by using the corresponding debug commands or GUI), for example, the programmer will read the note given by the anonymization string as clear text (since it became the memory content). This prevents the programmer from accidentally interpreting such memory areas as any "real/original" memory content that would be highly probably when overwriting the memory with non-obviously new content (e.g., zero bytes). In further embodiments the overwriting can be performed by using random text (byte contents), one-way enciphering (not allowing to decrypt the original content anymore), or masking (setting or resetting particular bits in all bytes concerned).

In one embodiment, if the full overwriting method is utilized and the dump/log file receiving party needs to access particular areas of the dump/log file for problem determination, a corresponding white list entry for this area may be passed to DALA. A re-processing of the original file with DALA may be performed in that case since the information was fully overwritten. This new version of the dump/log file will include the original data of the requested passage, but no longer fully overwritten.

Alternatively, a user may let DALA encrypt corresponding areas by using a length-neutral encryption method (e.g., partially encrypted). The encryption method may be a black box for DALA and is just a tool to hide confidential information. Therefore, any length-neutral encryption method can be used, and the DALA user may even make his or her own encryption/anonymization routine(s) available to DALA via the DALA API (application programming interface).

By using encryption, according to one embodiment, a dump/log file receiving party is potentially able to undo (e.g., unhide or decrypt) anonymization by using an undo or recovery software/service (also referred to as a DALA undo utility). This requires that a third-party log created by DALA, and the FAO-related encryption parameters (e.g., encryption method+parameters) are also available for the third-party as a dump/log file receiving party. The dump/log file providing party is always free in providing or telling the encryption parameters DALA has used for any particular file anonymization order(s). The DALA user, in practice the dump/log file owner, may receive all required information by referring to a master log (as part of DALA metadata) created during the anonymization process. In one embodiment, the third-party log (and the master log) may include the original data (encrypted or not), while the anonymized dump/log file will include fully-overwritten (anonymizing) text. In order to "recover" or "restore" any anonymized information, the third-party log and/or master log have to be utilized. Other configurations may exist.

For the dump/log file anonymization process, DALA allows a user to define a set of methods and keys, or the user may let DALA create a random-based selection and combination of both sets (including the option to also generate random keys). DALA thus is capable of using individual encryption parameters for each individual FAO (e.g., using multiple different encryption methods and/or parameters (e.g., keys) for different parts of a document). Further, DALA could also use a single method and key for the entire dump. This concept allows the dump/log file owning party to partially uncover/unhide information of a particular area of the dump/log file without having the need to uncover all the rest of information, and/or to resend any re-processed dump/log file to the third-party. Thus, such a mechanism prevents the dump/log file owner from having any "show all or nothing" situation. Using the random feature (e.g., method selection, key selection, key generation) prevents any weakening of the DALA use by routine-like behaviors, such as always using the same (standard) key (password) for any confidential data when exchanging dump/log files with a specific third-party, or using a single key for the entire dump/log file, etc.

Note that the above techniques have been described for the purposes of illustration only. Such a technique can also be applied to other documents or files. According to certain embodiments of the invention, the above techniques may be utilized for sharing certain portions of a file with another user by hiding certain sensitive information of the file. For example, when a first user to share a file with a second user, where the file includes a first area intended to be shared with the second user and a second area intended not to be shared with the second user. The first user may utilize the techniques described above by encrypting the second area with a predetermined key (e.g., public/private key pair) while leaving the first area unencrypted.

As a result, when the second user receives the file partially encrypted, the second user can only access content of the first area of the file without being capable of accessing the second area of the file. Further, if the second user desires to access the second area of the file, upon requested and approved, the first user may transmit the encryption key (e.g., public key) to the second user to decrypt content of the second area of the file.

According to a further embodiment, multiple portions of a file may be encrypted using multiple and/or different encryption methods or keys such that the file can be shared among multiple users without unnecessarily exposing the sensitive information of the file. If a particular recipient of the file desires to access content of a particular encrypted area and that particular recipient is eligible, the document provider (e.g., the party who shares the file) may provide the corresponding encryption key or necessary information to allow that particular recipient to decrypt the requested area of the file. Accordingly, the document provider may have to maintain information (e.g., lookup table or database) related to which areas of the file have been encrypted by which encryption methods or keys, etc. (see also DALA master log, and DALA third-party log).

In one embodiment, by default, certain areas of a file having sensitive information (e.g., detected by DALA) are encrypted until a recipient of the file demands for decryption. Upon requested, a corresponding encryption key is provided to the recipient to enable the recipient to decrypt the demanded area of the file. Other configurations may exist.

Using a deletion method, according to one embodiment, the byte sequence will be effectively removed. This implies a change of the dump/log file size and potential risks of altering the later usability of that dump/log file due to any damage in its logical structure. On the other hand, this method may reduce a file space in case most of the data would be anonymized (e.g., deleted). In practice, it can only be applied if missing information does not have any impact on the usability of the file, and the receiving party does not even need to know that this data were present in the dump/log file.

DALA allows a user to apply a mixture/combination of these methods by instructing the CIIs, or by setting up the white and black lists accordingly; the FAO, representing the order to anonymize a particular area of the dump/log file, will include all details. At each relevant level a user may select the anonymization method of user's choice, and define the required parameters, such as encryption method and key, and the anonymization text. Therefore, any dump/log file resulting from DALA's processing thus may include overwritten, encrypted and/or deleted areas. Regardless from the method used to anonymize data in the dump/log file, according to one embodiment, DALA keeps track of all FAOs performed within its different logs as part of DALA metadata.

Referring back to FIG. 4, metadata 404 includes a variety of log files generated during the anonymization process. In one embodiment, metadata 404 includes a master log representing an "official" document for internal use for recording or reporting all details regarding the anonymization process. Metadata 404 further includes a third-party log representing a document that may be attached to the anonymized dump file when being transmitted to a third-party as a dump file receiving party. In one embodiment, a third-party log is represented by a database table having certain information for a third-party. Metadata 404 further includes a protocol log representing another "official" document for internal use (e.g., auditing purposes) reporting details regarding the anonymization process in a compact manner. Metadata 404 further includes a review log for recording or reporting printable and other kinds of identified information that was not anonymized. The DALA allows a user to scan and use the review log entries to create "white/black list" entries, dictionary entries, or terminology entries, etc. in order to complete, optimize and improve the anonymization procedure; this lets DALA become able to learn for coming anonymization processing. Note that some or all of the components as shown in FIG. 4 may be implemented as software, hardware, or a combination of both.

Figure 5:
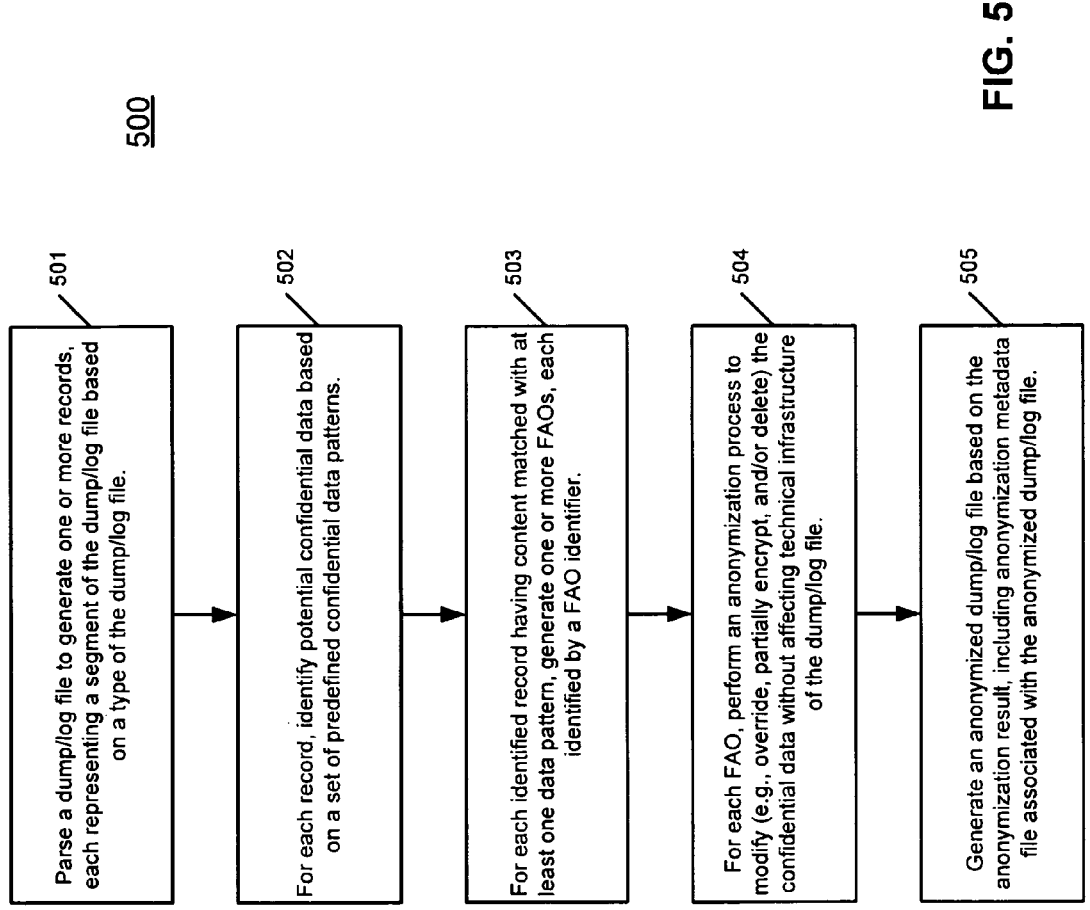
FIG. 5 is a flow diagram illustrating an anonymization process according to one embodiment of the invention.

FIG. 5 is a flow diagram illustrating an anonymization process according to one embodiment of the invention. Note that process 500 may be performed by processing logic which may include software, hardware, and a combination of both. For example, process 500 may be performed by system 400 of FIG. 4. Referring to FIG. 5, in response to a dump file, processing logic parses the dump file to generate one or more records, where each record represents a segment of the dump file based on a type of the dump file. The records may be performed by a memory content mapping unit 406 of FIG. 4. For each record, at block 502, processing logic identifies whether the respective record contains certain confidential data based on a set of predefined confidential data patterns/categories or characteristics. For example, the confidential data may be identified by confidential information identification (CII) unit 407 based on confidential information patterns/categories 411 stored in the knowledge base 405 of FIG. 4.

For each identified record having content matched with at least one data pattern/category, at block 503, processing logic generates one or more FAOs, where each FAOs is associated with and identified by a FAO identifier (FAO ID). Such a FAO ID may be subsequently used to coordinate and/or recover the potentially altered confidential information by an anonymized dump file recipient based on the anonymized dump file. For each FAO, at block 504, an anonymization process is performed to modify the identified confidential information without affecting the technical infrastructure of the original dump file. For example, after the anonymization process, a utility software (e.g., debugger or event log viewer) associated with the original dump file may still be able to process the anonymized dump file.

In one embodiment, the confidential information may be partially or fully modified (e.g., mask out) enough such that a recipient of the anonymized dump file cannot sufficiently reassemble from the anonymized dump file to recover the original confidential information. Alternatively, the confidential information may be completely deleted or removed. Furthermore, the confidential information may be encrypted using a variety of encryption methods such that the recipient cannot recover the confidential information without a decryption key. At block 505, an anonymized dump/log file is then generated based on the anonymization result. In addition, anonymization metadata is also created, which may be subsequently used to recover the anonymized confidential information upon request.

Figure 6A:
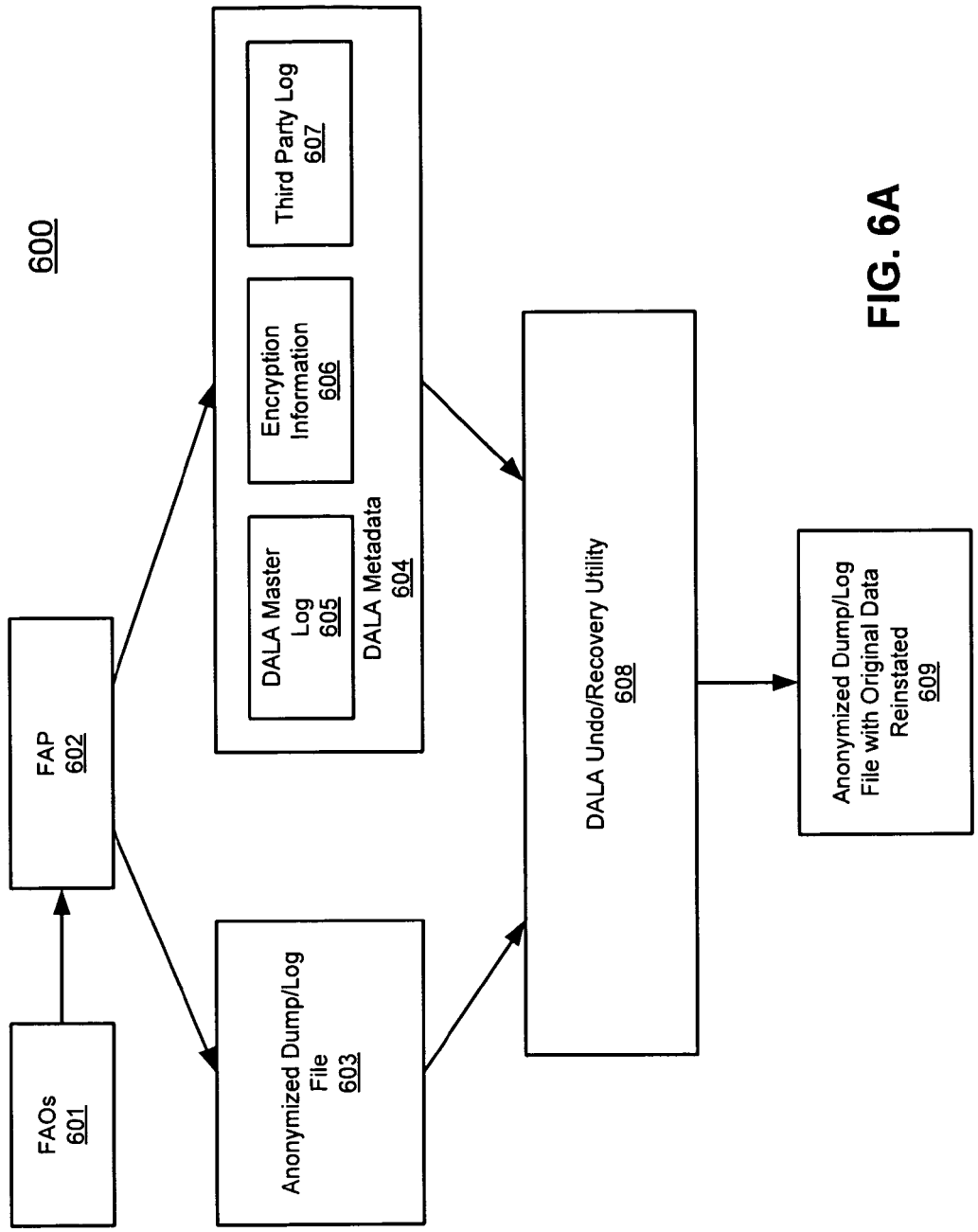

As described above, once an anonymized dump file has been created, under certain circumstances, the original confidential information of the original dump file may be recovered using an undo or recovery utility. FIG. 6A is a block diagram illustrating an example of an undo or recovery system according to one embodiment of the invention. For example system 600 may be provided to an anonymized dump file recipient as part of DALA utility 108 of FIG. 1 to allow the recipient to recover confidential information that has been anonymized under certain circumstances.

Referring to FIG. 6A, in this example, it is assumed that the confidential information has been encrypted using a predetermined encryption method and/or parameters (e.g., key), which is performed by FAP 602 based on FAO 601 as part of an anonymization performed by the DALA server. An anonymized dump file 603 is then generated as well as metadata 604. As described above, metadata 604 may include a master log 605, an encryption information base 606, and a third-party log 607. In one embodiment, anonymized dump file 603 and optionally third-party log 607 are transmitted to a third-party as an anonymized dump file recipient, where the anonymized dump file 603 includes the confidential information encrypted. Third-party log 607 may be transmitted along with the anonymized dump file 603 or alternatively, it may be transmitted subsequently upon request. When the recipient subsequently needs to recover the confidential information, the recipient may request certain encryption information from the DALA server that can be used to recover the confidential information. Once the recipient receives such encryption information, the recipient can utilize the DALA undo/recovery utility 608 to decrypt the encrypted confidential information using the encryption information received from the DALA server, which generates another version of anonymized dump file having at least a portion of confidential information recovered.

In one embodiment, when a recipient requests for encryption information, the recipient transmits a FAO ID that identifies a specific location of the dump file where the confidential information has been encrypted. The FAO ID may be obtained via the third-party log 607. In one embodiment, the DALA server may maintain a database containing information regarding encryption information associated with a particular FAO. For example, the database may include a list of entries. Each entry includes an encryption method and key associated with a particular FAO ID as shown in database 610 of FIG. 6B. Thus, when the DALA server receives a request for encryption parameters identified by a FAO ID, the DALA server may perform a lookup operation in database 610 to retrieve the requested encryption parameters based on the FAO ID.

The third-party log 607 provides all information required by a third-party (e.g., recipient) to request the required FAO-related encryption parameters from the dump/log file owner, when recovering a particular dump/log file area becomes necessary. The dump/log file receiving party will normally request the required DALA details from the dump/log file owner. The owner will then send the FAO-related undo parameters including the encryption method(s), key(s) etc. This information will be passed to the DALA undo utility 608 to make the selected portion(s) visible by creating a new version of the anonymized dump file 609 with the original confidential data.

The DALA undo function/service 608 itself can be provided either as locally running client software, or as a Web service. Due to the possible large size of dump/log files, even if transferred in a compressed manner, client software will generally be the favorite way to provide DALA Undo. For simplifying the dialog between a dump/log file owner and a third-party, the DALA manager includes a Web interface that may be offered to third-parties for entering and managing undo parameter requests.

Note that the encryption methods or keys may be pre-defined between the DALA server and the intended dump file recipients. For example, the encryption methods may utilize a private/public key pair maintained by the DALA server. The confidential information may be encrypted by the private key and the public key may be transmitted to the third-party upon request to enable the third-party to decrypt the confidential information using the public key. Alternatively, the key pair may be maintained by the dump file recipient. Prior to the anonymization, the dump file recipient registers with the DALA server with a particular encryption method that can be used by the DALA server to encrypt the confidential information. Other configurations may exist.

FIG. 7 is a flow diagram illustrating a process for recovering confidential information from an anonymized dump file according to one embodiment. Note that process 700 may be performed by processing logic which may include software, hardware, or a combination of both. For example, process 700 may be performed by system 600 of FIG. 6A. Referring to FIG. 7, at block 701, processing logic performs an anonymization process on an original dump file, generating an anonymized dump file and the associated metadata. At block 702, the anonymized dump file is transmitted to a third-party as an intended dump file recipient, where the anonymized dump file includes one or more areas having confidential information encrypted. At block 703, a request is received from the recipient requesting a particular encrypted area of the anonymized dump file to be decrypted, where the requested area is identified by a FAO ID. At block 704, processing logic identifies the requested encryption information from the metadata based on the FAO ID, and transmits the encryption information to the third-party to enable the third-party to decrypt and recover the confidential information. Alternatively, at block 705, the processing logic decrypts the confidential data and transmits the decrypted information to the third-party upon request.

Figure 8:
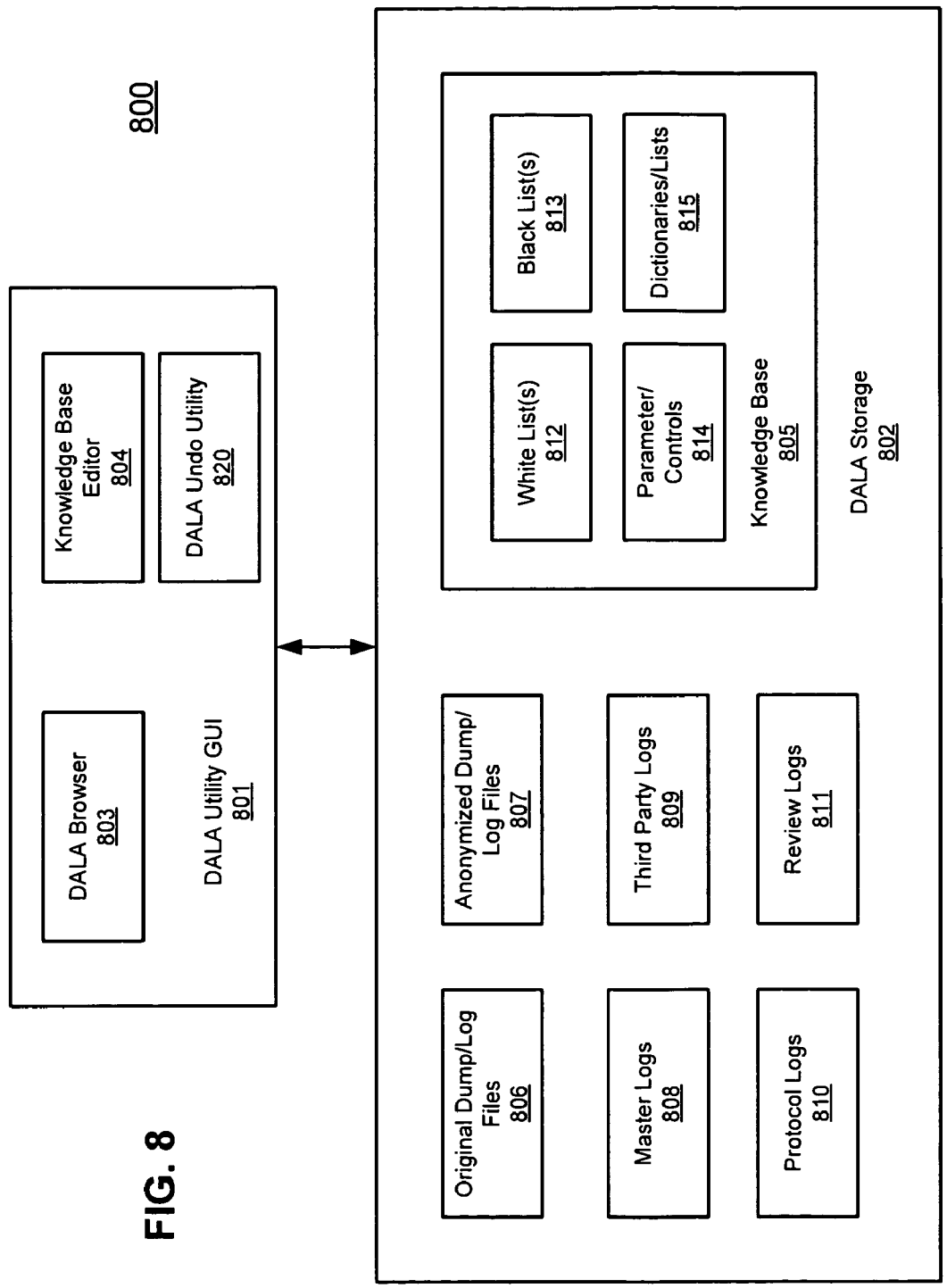
FIG. 8 is a block diagram illustrating an example of DALA utilities according to one embodiment.

According to one embodiment, DALA includes a set of graphical user interface (GUI) to allow an administrator to manage dump files and the related information. FIG. 8 is a block diagram illustrating an example of DALA utilities according to one embodiment. Referring to FIG. 8, in this embodiment, system 800 includes a DALA utility GUI 801 for accessing and managing information stored in storage 802, which may be implemented locally in a DALA server or remotely over a network. In one embodiment, storage 802 may be used to store a variety of DALA related files, such as, for example, original dump files 806, anonymized dump files 807, master log files 808, third-party log files 809, internal log files 810 (also referred to as protocol files), and review log files 811. In addition, storage 802 may be used to store knowledge base 805, which may include user specific configurations or settings such as white lists 812, block lists 813, as well as other information such as parameter/control data 814 and dictionaries/lists 815 (e.g. terminologies).

In one embodiment, DATA utility 801 includes a DALA browser 803, a knowledge base editor 804, and a DALA undo utility 820 which may be implemented as part of undo utility 608 of FIG. 6A. DALA browser 803 allows a user to browse information stored in storage 802 such as anonymized dump/log files 807 efficiently, namely in combination/relation with the log files 808-811. It makes all anonymized areas and DALA details, such as FAOs, etc. easily accessible and highly transparent. For example, a user can use the DALA browser 803 to determine all FAO-related information required to easily request the DALA undo-related information from the dump/log file owner to recover confidential information. Knowledge base editor 804 may be used to edit any information stored in the knowledge base 805 such as white lists 812 and/or black lists 813.

Note that the DALA concept can be applied to any type of files including one or more of the following principal file content categories: a) file type-related structural information going beyond simple line/record separation (e.g., via the "carriage return" and/or "line feed" control characters supported by the character set in use), namely more or less complex headers, record length fields, etc. representing the file-specific format; b) non-confidential (e.g. technical) information; and c) user information that is confidential from owner's perspective and needs to be hidden via anonymization.

In general, the term of a "log file" stands for less complex types of files, i.e. those not including information type (a) above. For example, a printable firewall log may be represented this way. Compared to log files, dump files, especially machine-readable ones, have a more complex format, i.e. include data of type (a) that may not be "damaged". DALA supports both types of files, i.e. with and without structural information. Due to this open conception, DALA supports most or all types of operating systems, i.e. dump/log files originating from any system. If DALA does not [need to] know the structure, it simply keeps "binary" untouched, and almost exclusively focus on readable text.

According to certain embodiments of the invention, DALA's anonymization procedure result in several logs, including a review log 811, protocol log 810, master log 808, and third-party log 809. Review log 811 includes results of the DALA review procedure. Protocol log 810 summarizes the anonymization process on a general level, and represents a more formal document certifying the transactions of the anonymization. It also provides some statistics on the anonymization process itself. Therefore, the protocol log 810 is primarily for internal use. For example, auditors will refer to the protocol log 810 when reviewing the policies applied by the company if dump/log files are exchanged with third parties.

Master log 808 includes all details of the entire anonymization process, such as a list of all File Anonymization Orders (FAOs) with all their details (e.g., FAO ID, the original content, anonymization method, related keys, etc.), details on the CII's decisions, etc. The master log 808 is only for internal use, and thus will not be exchanged with a third-party. DALA undo utility can use the master log to directly recover particular areas of the dump/log file.

Third-party log 809 includes the basic information on all anonymized dump/log file areas, such as principal information on the File Anonymization Orders (FAOs). It thus is a subset of master log 808 without allowing a user to directly recover. Providing the third-party log 809 to any third-party as an attachment to the actual dump/log file is completely optional. A third-party is always able to process the dump/log file without third-party log 809. It only assists the third-party in better understanding/interpreting the dump/file, and is required when using DALA undo process becomes necessary; it processes the third-party log 809 to unhide data, i.e. to determine the FAOs responsible for a particular anonymized area.

Referring back to FIG. 8, dump/log files may be very large and even include several gigabytes of data. It is almost impossible to perform a manual screening on this data by using any editor. Aside from data volume, most editors are unable to process binary coded data since they are designed for showing text data only. Therefore, according to one embodiment, the examination of whether any confidential information could be potentially left in the dump/log file after/even DALA's processing is a complex task. DALA supports this with its review capabilities creating a review log, such as review log 811 that includes at least the following information:

- All non-anonymized data resulting from explicit user requests such as received via white list entries.
- A post-scan of the resulting anonymized dump/log is performed based on selected confidential information identifiers (CIIs) running different than during regular anonymization, such as without terminologies and other "white information". The primary CII used in the review context is the printable text identifier. Optionally a user may even allow this CII running during review without any terminology list, i.e. without excluding technical terms, in order to check any text remained. DALA even allows a user to run user's own review procedures by using the corresponding DALA API.
- The DALA browser 803 includes corresponding functions to extract relevant terms/strings from the review log 911 to include them in DALA's knowledge base 805 such as in dictionaries, etc., to become available/usable at next DALA processing of dump/log files.

The DALA review process assists a user in setting up a "neutral" quality assurance that is checking DALA's dump/log file anonymization success. Note that the review concept does not indicate and report which data DALA was identified as confidential information, but the potentially critical information that was not anonymized, and thus is left in the dump/log file. It primarily represents an assurance against incomplete anonymization caused by the DALA user, such as due to any disabled feature (e.g. CII), incomplete user-defined patterns/categories, not yet registered terminologies, etc.

Figure 9:
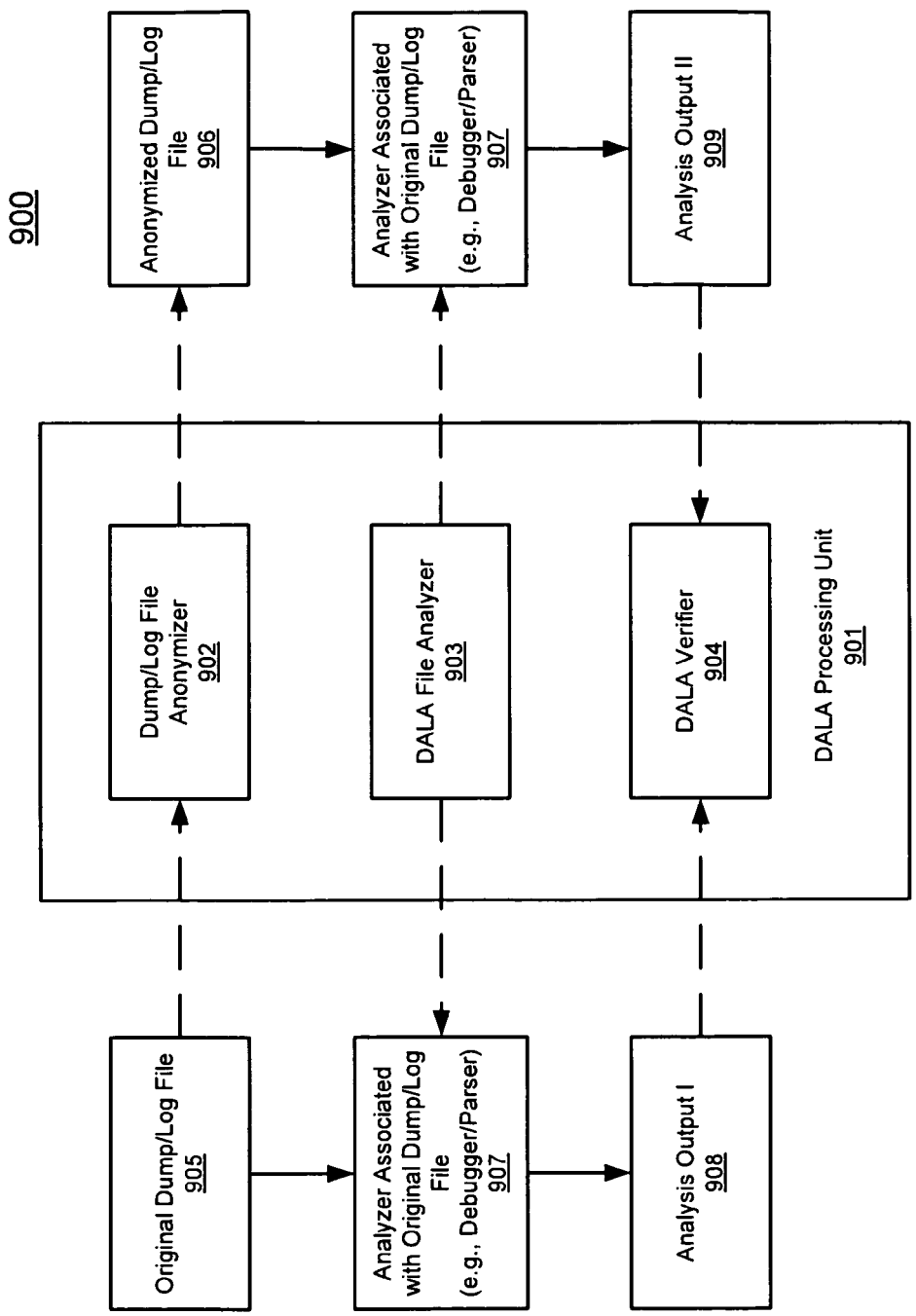
FIG. 9 is a block diagram illustrating an example of a DALA verification system according to one embodiment of the invention.

According to certain embodiments of the invention, in order to ensure that the anonymized dump file is still technically compatible with the original dump file, DALA provides a verification tool for verifying the integrity of anonymized dump/log files if corresponding non-DALA analysis-tools are available. For example, for Windows application dumps DALA may use the Windows Debugger. FIG. 9 is a block diagram illustrating an example of a DALA verification system according to one embodiment of the invention. Referring to FIG. 9, system 900 includes a DALA processing unit 901 which may be implemented as part of processing unit 205 of FIG. 2. In one embodiment, processing unit 901 includes a dump file anonymizer 902, a DALA file analyzer 903, and a DALA verifier 904.

As described above, dump file anonymizer 902 is configured to anonymize an original dump file 905 by removing, altering, or encrypting certain identified confidential information, generating an anonymized dump file 906. In order to verify whether the technical infrastructure of the dump file has not been compromised, DALA file analyzer 903 may invoke an original analyzer 907 that is associated with the original dump file 905. For example, if the original file 905 is a debug output dump file, the analyzer 907 may be a debugging utility. In this example, analyzer 907 is invoked to perform an analysis on both the original dump file 905 and the anonymized dump file 906, which generate a first analysis output 908 and a second analysis output 909. Thereafter, DALA verifier 904 compares both outputs 908-909 to determine whether they are technically identical or sufficiently similar.

Note that the verification utility as shown in FIG. 9 may be provided by a user or a vendor associated with the original dump file creator. Therefore, the DALA user has to provide/install these tools and make them available to DALA. The DALA API also allows integration of user-defined verification routines. Any number of tools may be enabled for DALA's verification of a given anonymized dump/log file or file type. The verification procedure's principal is based on logically comparing the results 908-909 (e.g., output/list/error files) resulting from analyzing the original as well as the anonymized dump/log file.

As described above, DALA allows integration of user-defined functions/routines/objects on the following, but not limited to levels via the DALA application interface (API). A user may provide user's own anonymization methods. For example, these methods could do simple overwriting, encryption, length-neutral or not, etc. A user may further provide character sets identifying printable text, confidential information identifier (CII) routines to identify highly individual data, review routines executed during DALA's review processing in order to identify any confidential information left after DALA's anonymization processing, and dump/log file consistency check routines applied to check that the anonymized dump/log file has kept its "technical value."

According to one embodiment, support for user-defined data pattern allows a user to anonymize specific words, phrases or strings globally in the given dump/log file with a common anonymization method. For example, a user may anonymize "John Smith" in the entire file with anonymization common parameters (a single FAO may result anonymizing all occurrences). If the user provides the FAO encryption-related parameters for this single FAO, the recipient may unhide (all occurrences of) "John Smith". In a more abstract concept, such as for text documents, a user could, for example, X-away the name of a secret person globally, like when the press receives documents from the government's archive where names most often are Xed.

According to a further embodiment, the DALA concept can also be applied to outgoing communications such as emails, FTP (file transport protocol), or HTTP (hypertext transport protocol), etc., concerning text and attachments. For example, DALA may be configured to read the MIME coding to recreate the original file. In this example, DALA represents a middle-man first receiving the entire data, anonymizing the data that actually should be transferred, and transferring it to the actual destination. For example, it would receive the file first, anonymizes it, and transfers it afterwards to the actual destination.

According to certain alternative embodiments of the invention, dump files are provided in two formats: 1) machine-readable (binary); and 2) printable. Both types are supported by DALA. Printable dumps pass certain kinds of DALA[-internal] pre-processing performed by a binary extractor for creating a binary format from the print format of the memory content. Regardless from this extraction and conversion the actual anonymization is still performed in the original readable dump/log file format.

The binary extractor searches for lines in the dump file reporting memory content as readable text, such as in the following sample:

```
27A8F3E4=+000000:D7D44BD4D7D9F14BE2C8C5D9D3D6C3D2=PM.MPR1.SHERLOCK
27A8F3F4=+000010:4BE2D4C64BC4E4D4D7C6C9D3C5404040=.SMF.DUMPFILE
27A8F404=+000020:4040404040404040404040404040404040=
27A8F414=+000030:4040404040404040E2D6D9E340C6C9=          SORT FI
27A8F424=+000040:C5D3C4E27E4DF56BF86BC3C86BC16BF1=ELDS=(5,8,CH,A,1
27A8F434=+000050:F96BF1F16BC3C86BC16BF3F96BF86BC3=9,11,CH,A,39,8,C
27A8F444=+000060:C86BC16BF8F76BF86BC3C86BC16B4040=H,A,87,8,CH,A,
27A8F454=+000070:404040404040404040404040404040404E=            +
27A8F464=+000080:4040404040404040404040404040404040=
27A8F474=+000090:40404040404040F1F46BF46BC3C86BC1=         14,4,CH,A
27A8F484=+0000A0:6BF1F0F56BF3F66BC3C86BC15D6BC5D8=,105,36,CH,A),EQ
27A8F494=+0000B0:E4C1D3E240404040404040404040404040=UALS
27A8F4A4=+0000C0:4040404040404040404040404040404040=
27A8F4B4=+0000D0:4040404040404040400000EA6000001388=      ...-...h
27A8F4C4=+0000E0:00020000025800000700000000000000=................
27A8F4D4=+0000F0:00000000          =....
```

DALA will internally create a memory segment including the byte sequence 0x"D7D44BD4D7D9F14 . . . " as it would come from a machine-readable (binary) dump file. DALA's content memory mapper provides DALA-internally the relation among the positions inside the original readable dump file (each memory byte is represented by 2 characters representing the 2 hexadecimal digits, and optionally by the character in the print representation depending on the readable dump format) and the derived memory content resulting from the above given conversion procedure.

Operations of "dump capturing" and "dump anonymization" may be distributed among the client and DALA server. For example, local DALA agents will collect the dump/log files and forward them, completed with additional information on the client system, to the central DALA server where the actual anonymization process is performed. If suitable, the DALA agent may also perform the entire anonymization process locally, such as in a single-computer environment or in context of any automated third-party dump forwarding. In case a DALA server is running, it will receive the already anonymized dump/log file, and will primarily be the platform to manage dump/log files.

DALA can even process files without knowing any detail on the file structure, such as on any record headers, etc. The challenge in such a case primarily concerns not to overwrite or "touch" the structural information that is mostly binary coded. Therefore, the printable text identifier CII in combination with terminology lists achieves safe decisions even in case DALA does not know the entire file structure. DALA's motto in such a case is "do never touch binary," but only highly significant text, since binary will highly probably represent structural information.

Accordingly, DALA is able to process XML (extensible markup language) files by ignoring the XML-structural information. Application-related dump/log files (e.g., Oracle, DB2, MSSQL, and MySQL) are also highly critical, and will be processed accordingly by DALA. In case of any non-public format DALA will treat the dump file like a log file. Note that an XML file is utilized as an example for the illustration purpose only; other script or programming languages (e.g., HTML or hypertext markup language) may also be applied.

Confidential information may be included as printable text in a dump/log file in any character set (ASCII, EBCDIC, Unicode, etc.), or even in the form of a byte sequence representing compressed and/or enciphered data. DALA supports all that by offering free selection and configuration of character sets, etc.

If the dump/log file does not provide required information, such as the type/class of a particular memory area, in one embodiment, DALA will try to refer to the runtime environment (system) having created the dump/log file in order to determine required information.

DALA may create a checksum for the original and the anonymized dump/log file as well as for all its logs. It also checks that both the original and anonymized file have the same length if no effective deletion was applied by an FAO.

The condition requesting a length-neutral anonymization (method) only results from the idea not risking any structural error in the dump file (so that an ordinary utility such as a debugger can still process the dump file after the anonymization). For example, any headers and pointers may become invalid if the amount of data (e.g., length of block) is changed without adapting/updating the structural information. Other configurations may exist.

Alternatively, a data structure may be used that includes a length field and thus allows any encryption method that creates data with a maximum total length of "length (data to be anonymized)–length (length field)". That is, it may also "compress" the data, and any free area is just padded (e.g. with blanks or zero bytes in order to achieve the original length). The length field indicates how long the field actually is.

Different embodiments are possible to improve conditions of DALA's application (e.g. DALA processing time, DALA user efforts) where several parties have to receive an anonymized version of a given dump file. According to certain embodiments, the third-party log could already include the encrypted data of anonymized areas, not just the FAO ID, for several different receivers. All parties will receive the same anonymized dump file that may include any content in anonymized areas of its content; means any method of overwriting/anonymization may be applied. However, one receiver cannot use the other one's undo parameters to decrypt anonymized areas. That is, the given original data (that will be anonymized) is immediately encrypted differently for n potential receivers, so that a given third-party log may satisfy several receiving parties. Alternatively, DALA is creating n separate third-party logs for n receiving parties. Each resulting third-party log will include the anonymization data (e.g., encryption method, encrypted data) for each FAO, i.e. DALA has virtually performed/created the FAO n times, namely for the n receivers, each time with a different encryption method and/or key. Alternatively, DALA can be advised that the third-party includes the original dump file content for some/all FAOs without being encrypted. In this case you omit the opportunity of having full control on un-hiding content, but directly/immediately provide the original content when forwarding the third-party log.

With a single DALA processing a user may immediately create n third-party logs for n receiving parties; all share/receive the same anonymized dump file. Accordingly, a single master log or n separate master logs can be created. If a user tells one party details on how to undo a given FAO, any other party cannot also undo the anonymization since the corresponding FAO was performed with a different method/key. Applying this n third-party (and/or n master) log mode implies the third-party log will include the encrypted data, the anonymized dump/log file will include "anything" (e.g. the common anonymization string). The benefit is that the user does not need to create n anonymized versions of a given dump/log file by performing DALA's processing n times, if several parties (e.g. software vendors) will receive the same dump/log file to perform their analyses. This saves time since DALA's processing of a n gigabyte dump/log file is not completed after some seconds.

It is important to note that DALA is able to learn the/new technical terminology, i.e. it can be trained easily. This is important in order to achieve an efficient dump/log file anonymization process. And each processed file automatically improves DALA's capabilities to distinguish between confidential and technical information. The DALA review process is an important part of this learning step. The user can easily derive new terminology entries from each string/word/text that was left in the dump/log file in order to confirm their characteristic. Next time, DALA already knows these new strings/words/texts, and the resulting anonymization is automatically improved.

DALA differs among several terminologies, such as one for the Windows operating system, others for z/OS, SQL, Oracle databases, etc. Each of these environments internally (i.e. on runtime level) "work" with both common IT terms/words, and also with unique terms/words; both may appear anywhere in the dump/log file. DALA enables any set/combination of terminologies for being used during the anonymization process. If such an explicit setting is missing it works with corresponding standards derived from the dump/log file format and the environment the file comes from. If a terminology is missing or not enabled, the DALA user may/will recognize this during the review process.

For log files, a basic logical format description may be provided to DALA including format details, such as logical column numbers, field separators used, etc. Logical column or absolute column ranges may be used when configuring details of DALA's anonymization process (e.g. a white list may prevent any logical columns from being anonymized).

Note that throughout this application, DALA has been described in view of dump files. However, it is not so limited. The techniques described herein may be applied to other types of files or content. For example, DALA may be utilized to process files that have been "deleted" by a user and stored in a trash can or recycle bin of an operating system. In this case, the abstraction of DALA is a system that would include both a) interception of the regular file deletion process that normally includes a file movement to "trash can" or "recycle bin," and b) anonymization of such files. As a consequence, any file in the "trash can" or "recycle bin" will be anonymized completely, i.e. anonymization would/could almost correspond to full encryption.

This differs slightly from the actual idea standing behind DALA's anonymization, namely keeping the actual usability of such a file for the receiving party by keeping most of the information visible/unhidden/non-encrypted.

Further, according to some embodiments, after anonymization, there is a way back to restore the original file content if a user applies DALA's "anonymization by encryption" method as explained above (in practice a company will most likely keep both original and anonymized dump/log file anyway in the DALA manager). DALA primarily focuses files including "technical information", such as dumps and logs that are forwarded to others, and may include a minor amount (e.g., actually unrecognized) of confidential information. Rather, only the confidential information is encrypted. Therefore, the general need for DALA's application will be in situations where the entire file may or need not to be fully encrypted since any regular "full file" encryption prevents achieving the actual goal that the file (excluding its confidential parts) will be processed by one or more third-parties (e.g. software vendors for problem determination). Dump files are highly representative for this ratio between confidential and non-confidential data stored in a file (e.g., in a given n gigabyte system dump the confidential part will probably include only a few megabytes).

Theoretically, this concept could be made more abstract and free of the relation to the dump/log analysis problem in the sense of a "partial file browser", "confidential file browser", "hide privacy browser", or "confidential-X" utility applicable on any kind of file, and/or supporting specific files in a special manner (like dump/log files). The purpose would be to provide any kind of files to third parties by hiding the confidential sections. For the purposes of illustration herein, a "dump file" may be referred to as files with/including structural data (headers, etc.), and a "log file" may be referred to as "plain text" files.

Further, the concept of anonymization of log files can be utilized as an alternative to deletion. For example, in Europe, there are strict laws on how long log data that includes personalized information, may be stored (e.g. only 180 days). Instead of complete deletion of the file, DALA could offer a way to keep the technical facts but just remove the personal part, or encrypts it, and only official/governmental institutions can unhide it. Other configurations may exist.

Figure 10:
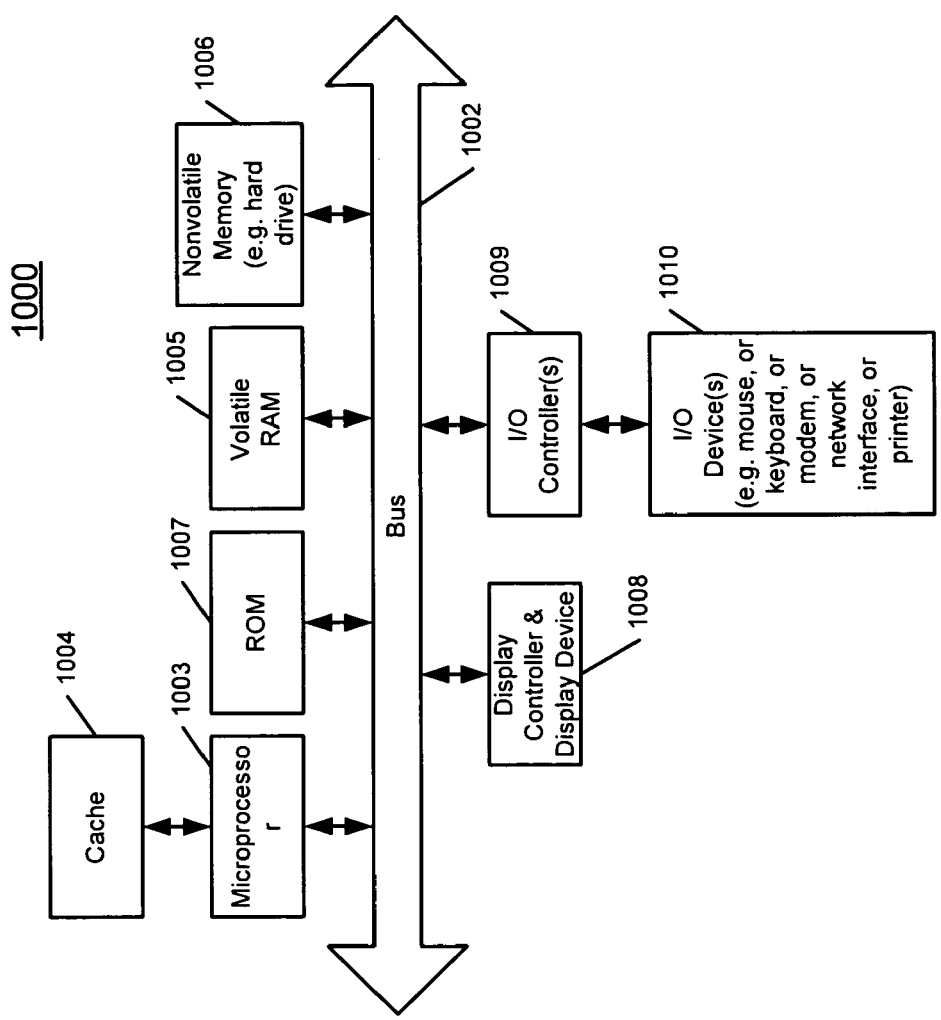
FIG. 10 is a block diagram of a digital processing system which may be used with one embodiment of the invention.

FIG. 10 is a block diagram of a digital processing system which may be used with one embodiment of the invention. For example, the system 1000 shown in FIG. 10 may be used as a client computer system such as clients 101-102 and 105 of FIG. 1. Alternatively, the exemplary system 1000 may be implemented a server such as server 104 of FIG. 1.

Note, that while FIG. 10 illustrates various components of a computer system, it is not intended to represent any particular architecture or manner of interconnecting the components, as such details are not germane to the present invention. It will also be appreciated that network computers, handheld computers, cell phones, and other data processing systems which have fewer components or perhaps more components may also be used with the present invention. The computer system of FIG. 10 may, for example, be an Apple Macintosh computer or an IBM compatible PC.

As shown in FIG. 10, the computer system 1000, which is a form of a data processing system, includes a bus 1002 which is coupled to a microprocessor 1003 and a ROM 1007, a volatile RAM 1005, and a non-volatile memory 1006. The microprocessor 1003, which may be, for example, a PowerPC G4 or PowerPC G5 microprocessor from Motorola, Inc. or IBM, is coupled to cache memory 1004 as shown in the example of FIG. 10. The bus 1002 interconnects these various components together and also interconnects these components 1003, 1007, 1005, and 1006 to a display controller and display device 1008, as well as to input/output (I/O) devices 1010, which may be mice, keyboards, modems, network interfaces, printers, and other devices which are well-known in the art. Typically, the input/output devices 1010 are coupled to the system through input/output controllers 1009. The volatile RAM 1005 is typically implemented as dynamic RAM (DRAM) which requires power continuously in order to refresh or maintain the data in the memory. The non-volatile memory 1006 is typically a magnetic hard drive, a magnetic optical drive, an optical drive, or a DVD RAM or other type of memory system which maintains data even after power is removed from the system. Typically, the non-volatile memory will also be a random access memory, although this is not required. While FIG. 10 shows that the non-volatile memory is a local device coupled directly to the rest of the components in the data processing system, it will be appreciated that the present invention may utilize a non-volatile memory which is remote from the system, such as a network storage device which is coupled to the data processing system through a network interface such as a modem or Ethernet interface. The bus 1002 may include one or more buses connected to each other through various bridges, controllers, and/or adapters, as is well-known in the art. In one embodiment, the I/O controller 1009 includes a USB (Universal Serial Bus) adapter for controlling USB peripherals. Alternatively, I/O controller 1009 may include an IEEE-1394 adapter, also known as FireWire adapter, for controlling FireWire devices.

Thus, techniques for dump and log anonymization have been described herein. Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the present invention also relate to an apparatus for performing the operations herein (e.g. as a "DALA computer appliance"). This apparatus may be specially constructed for the required purposes, or it may comprise a general-purpose computer selectively activated or reconfigured by a computer program stored in the computer. Such a computer program may be stored in a computer readable medium. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), a machine (e.g., computer) readable transmission medium (electrical, optical, acoustical or other form of propagated signals (e.g., carrier waves, infrared signals, digital signals, etc.)), etc.

The algorithms and displays presented herein are not inherently related to any particular computer or other apparatus. Various general-purpose systems may be used with programs in accordance with the teachings herein, or it may prove convenient to construct more specialized apparatus to perform the required method operations. The required structure for a variety of these systems will appear from the description below. In addition, embodiments of the present invention are not described with reference to any particular programming language. It will be appreciated that a variety of programming languages may be used to implement the teachings of embodiments of the invention as described herein.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A computer-implemented method for processing dump files, the method comprising:
   receiving an original dump file from a client machine to be forwarded to a dump file recipient, wherein the original dump file is generated from a software component running within the client machine, the original dump file recording certain runtime data and/or activities of the software component;
   parsing the original dump file to identify certain content of the original dump file that matches one or more predetermined data patterns;
   anonymizing the original dump file by modifying the identified content of the original dump file according to one or more predetermined algorithms associated with the one or more predetermined data patterns, such that the identified content of the original dump file is no longer exposed, generating an anonymized dump file;
   verifying that technical infrastructure of the original dump file is maintained within the anonymized dump file after modifying content of the original dump file; and
   transmitting the anonymized dump file to the dump file recipient, wherein technical infrastructure of the original dump file is maintained within the anonymized dump file after the anonymization such that a utility application designed to process the original dump file can still process the anonymized dump file without exposing the identified content of the original dump file to the dump file recipient.

2. The method of claim 1, wherein the software component is one of an application and/or an operating system running within the client machine, wherein the original dump file is one of a debug dump file and a log file logging events of the software component.

3. The method of claim 1, wherein the original dump file is received from the client machine over a first network and wherein the anonymized dump file is transmitted to the dump file recipient over a second network.

4. The method of claim 3, wherein the original dump file is captured within the client machine and transmitted by a local agent over the first network without storing the original dump file in a local storage of the client machine, and wherein the local agent further transmits, along with the original dump file, information representing certain characteristics of a local operating environment of the client machine.

5. A computer-implemented method for processing dump files, the method comprising:
  receiving an original dump file from a client machine to be forwarded to a dump file recipient, wherein the original dump file is generated from a software component running within the client machine, the original dump file recording certain runtime data and/or activities of the software component;
  parsing the original dump file to identify certain content of the original dump file that matches one or more predetermined data patterns, including
    generating a plurality of content mapping data structures representing a sequence of continuous memory areas, wherein each content mapping data structure represents a memory area in one of a virtual memory space and physical memory space dependent upon an operating environment of the client machine from which the original dump file was generated,
    for each content mapping data structure, examining one or more memory content patterns/categories of the respective content mapping data structure to determine whether there is a memory content pattern/category that matches one of the predetermined data patterns/categories, and
    for each memory content pattern/category that matches one of the predetermined data patterns/categories, generating a file anonymized order (FAO) that identifies one or more predetermined actions to be performed for anonymization,
  anonymizing the original dump file by modifying the identified content of the original dump file according to one or more predetermined algorithms associated with the one or more predetermined data patterns, such that the identified content of the original dump file is no longer exposed, generating an anonymized dump file; and
  transmitting the anonymized dump file to the dump file recipient, wherein technical infrastructure of the original dump file is maintained within the anonymized dump file after the anonymization such that a utility application designed to process the original dump file can still process the anonymized dump file without exposing the identified content of the original dump file to the dump file recipient.

6. The method of claim 5, wherein each of the one or more predetermined data patterns/categories is represented by a data pattern data structure that is previously defined and stored in a knowledge base, wherein each data pattern data structure represents characteristics of specific content to be anonymized.

7. The method of claim 6, wherein the knowledge base further comprises:
  a dump type information base having data for identifying a type and/or structure of the original dump file;
  a black list that explicitly lists one or more inclusive data patterns/categories when matched, the anonymization is always performed;
  a white list that explicitly lists one or more exclusive data patterns/categories when matched, the anonymization would not be performed; and
  terminologies (dictionaries including word/string lists) representing the non-confidential data of the corresponding environment and context the dump/log file comes from.

8. The method of claim 7, further comprising providing a user interface to allow a user to edit information stored in the knowledge base, including editing the black lists, the white lists, dictionaries, terminologies, and the dump type information base.

9. The method of claim 5, wherein anonymizing the original dump file comprises, for each FAO, modifying content of the original dump file that is identified within the respective FAO using an algorithm specified within the respective FAO, including at least one of overwriting the identified content, encrypting at least a portion of the identified content, and removing the identified content.

10. The method of claim 9, further comprising:
  generating a metadata file having metadata representing activities of the anonymization, the metadata including at least a FAO identifier and information identifying an encryption method including related encryption parameters that is used to encrypt the identified content; and
  optionally storing the metadata file, the original dump file, the anonymized dump file in a storage, and encrypted data, such that at least a portion of the anonymized content of the original dump file can be subsequently recovered based on the metadata.

11. The method of claim 10, further comprising:
  generating a third-party log file based on the metadata file, the third-party log file including one or more FAO IDs identifying one or more anonymization actions performed on the original dump file; and
  transmitting the third-party log file to the dump file recipient such that the dump file recipient can reference one or more areas of the anonymized dump file using the one or more FAO IDs.

12. The method of claim 11, further comprising:
  receiving a request from the dump file recipient requesting detailed information of an area of the anonymized dump file that has been anonymized;
  identifying the requested area of the anonymized dump file based on a FAO ID specified within the request using the metadata file associated with the anonymized dump file; and
  transmitting the requested detailed information to the dump file recipient, the transmitted detailed information including information that can be used to recover at least a portion of original content of the anonymized area of the anonymized dump file.

13. The method of claim 12, wherein the transmitted detailed information includes information identifying an encryption method and related encryption parameters for encrypting the original content, such that the dump file recipient can decrypt the anonymized area of the anonymized dump file to recover the original content, and wherein the encryption method is identified from the metadata in view of the FAO ID specified within the request.

14. The method of claim 13, wherein the information identifying the encryption method for encrypting the original content includes an encryption key which is used by the dump file recipient to decrypt the anonymized dump file to recover the original content.

15. The method of claim 14, wherein the anonymized dump file includes multiple areas that have been encrypted using different encryption keys, wherein an encryption key transmitted to the dump file recipient in response to the request is identified based on a FAO ID retrieved from the request received from the dump file recipient.

16. The method of claim 10, further comprising providing a user interface to allow a user to managing the original dump files, the anonymized dump files, and the metadata stored in the storage.

17. The method of claim 5, further comprising verifying technical infrastructure of the original dump file is maintained within the anonymized dump file, such that the utility application associated with the original dump file can still process the anonymized dump file without exposing the identified content of the original dump file to the dump file recipient.

18. The method of claim 17, wherein verifying the technical infrastructure of the original dump file comprises:
 invoking a dump file analyzer associated with the utility application of the original dump file to perform an analysis on the original dump file, generating a first analysis result;
 invoking the same dump file analyzer to perform the same analysis on the anonymized dump file, generating a second analysis result; and
 comparing the first result and the second result to ensure that the technical infrastructure is intact.

19. A non-transitory machine-readable storage medium having instructions stored therein, which when executed by a machine, cause the machine to perform a method for processing dump files, the method comprising:
 receiving an original dump file from a client machine to be forwarded to a dump file recipient, wherein the original dump file is generated from a software component running within the client machine, the original dump file recording certain runtime data and/or activities of the software component;
 parsing the original dump file to identify certain content of the original dump file that matches one or more predetermined data patterns/categories;
 anonymizing the original dump file by modifying the identified content of the original dump file according to one or more predetermined algorithms associated with the one or more predetermined data patterns/categories, such that the identified content of the original dump file is no longer exposed, generating an anonymized dump file;
 verifying that technical infrastructure of the original dump file is maintained within the anonymized dump file after modifying content of the original dump file; and
 transmitting the anonymized dump file to the dump file recipient, wherein technical infrastructure of the original dump file is maintained within the anonymized dump file after the anonymization such that a utility application designed to process the original dump file can still process the anonymized dump file without exposing the identified content of the original dump file to the dump file recipient.

20. An apparatus for processing dump files, comprising:
a processor; and
a memory coupled to the processor to store instructions, which when executed from the memory, cause the processor to
 receive an original dump file from a client machine to be forwarded to a dump file recipient, wherein the original dump file is generated from a software component running within the client machine, the original dump file recording certain runtime data and/or activities of the software component,
 parse the original dump file to identify certain content of the original dump file that matches one or more predetermined data patterns,
 anonymize the original dump file by modifying the identified content of the original dump file according to one or more predetermined algorithms associated with the one or more predetermined data patterns, such that the identified content of the original dump file is no longer exposed, generating an anonymized dump file,
 verify that technical infrastructure of the original dump file is maintained within the anonymized dump file after modifying content of the original dump file, and
 transmit the anonymized dump file to the dump file recipient, wherein technical infrastructure of the original dump file is maintained within the anonymized dump file after the anonymization such that a utility application designed to process the original dump file can still process the anonymized dump file without exposing the identified content of the original dump file to the dump file recipient.

21. The non-transitory machine-readable storage medium of claim 19, wherein the software component is one of an application and/or an operating system running within the client machine, wherein the original dump file is one of a debug dump file and a log file logging events of the software component.

22. The non-transitory machine-readable storage medium of claim 19, wherein the original dump file is received from the client machine over a first network and wherein the anonymized dump file is transmitted to the dump file recipient over a second network.

23. The apparatus of claim 20, wherein the software component is one of an application and/or an operating system running within the client machine, wherein the original dump file is one of a debug dump file and a log file logging events of the software component.

24. The apparatus of claim 20, wherein the original dump file is received from the client machine over a first network and wherein the anonymized dump file is transmitted to the dump file recipient over a second network.

* * * * *